Figure 16:
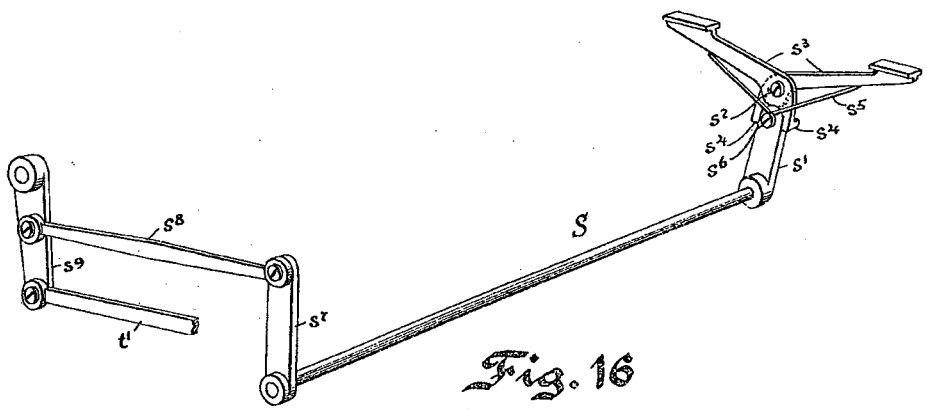

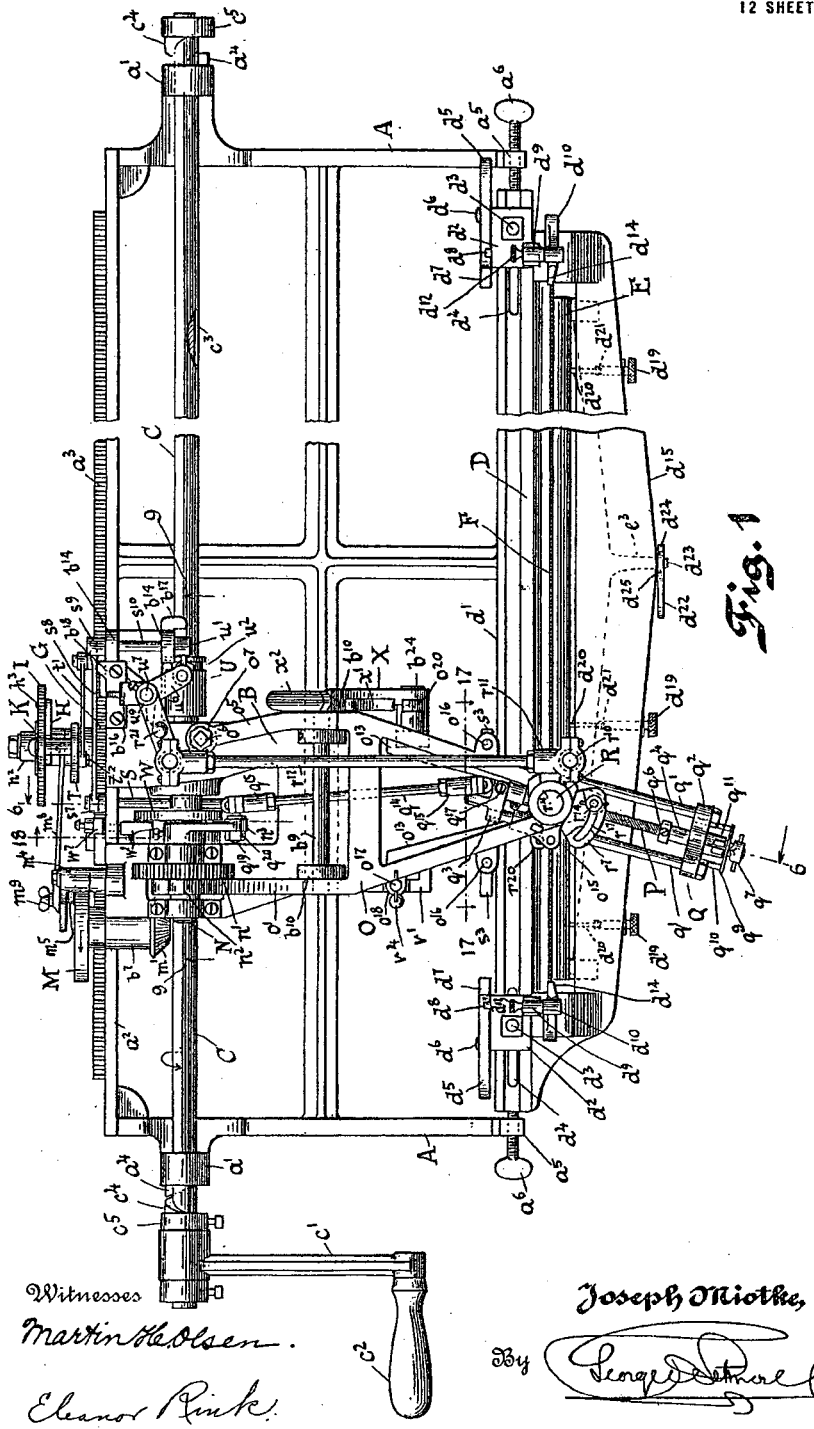

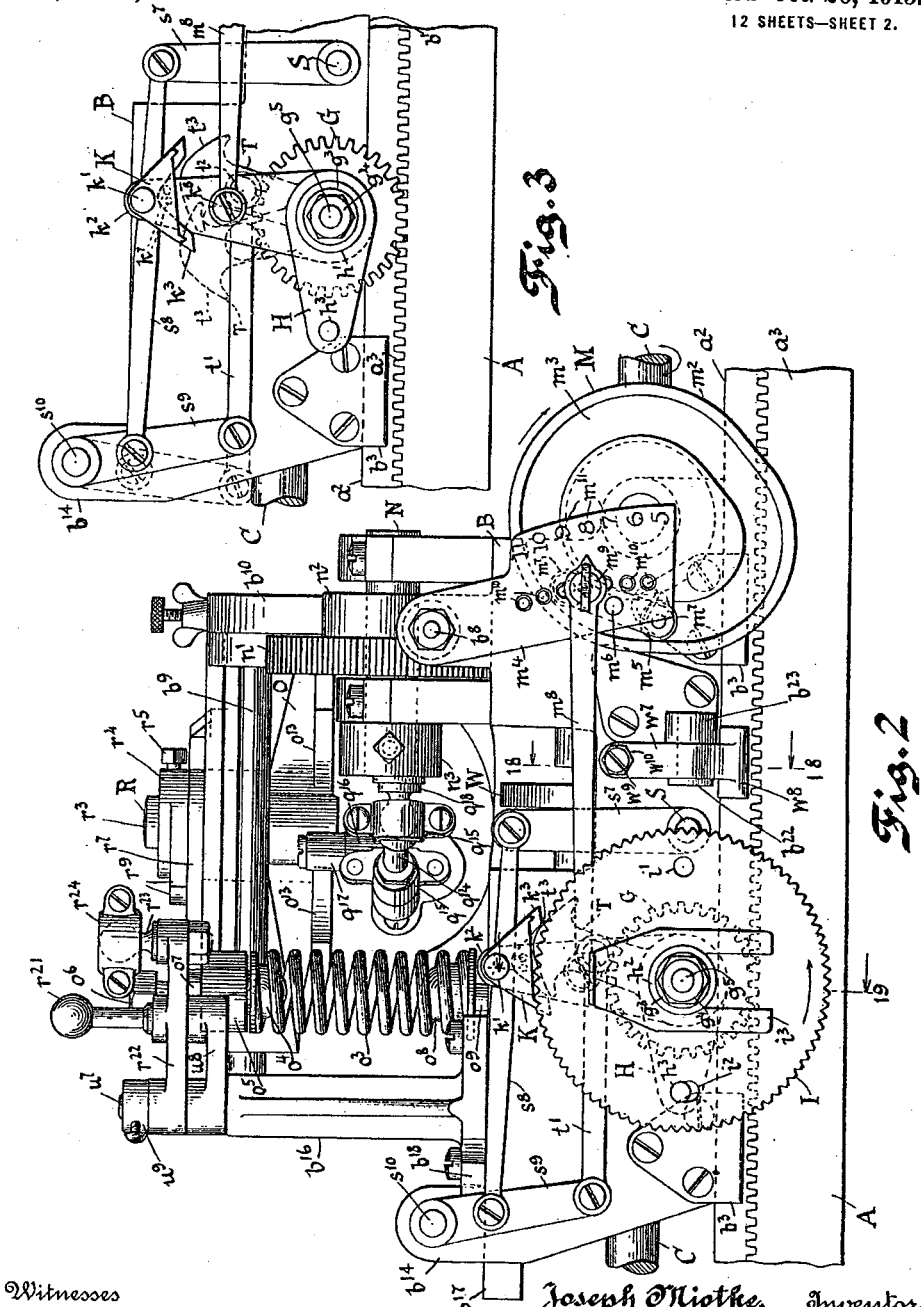

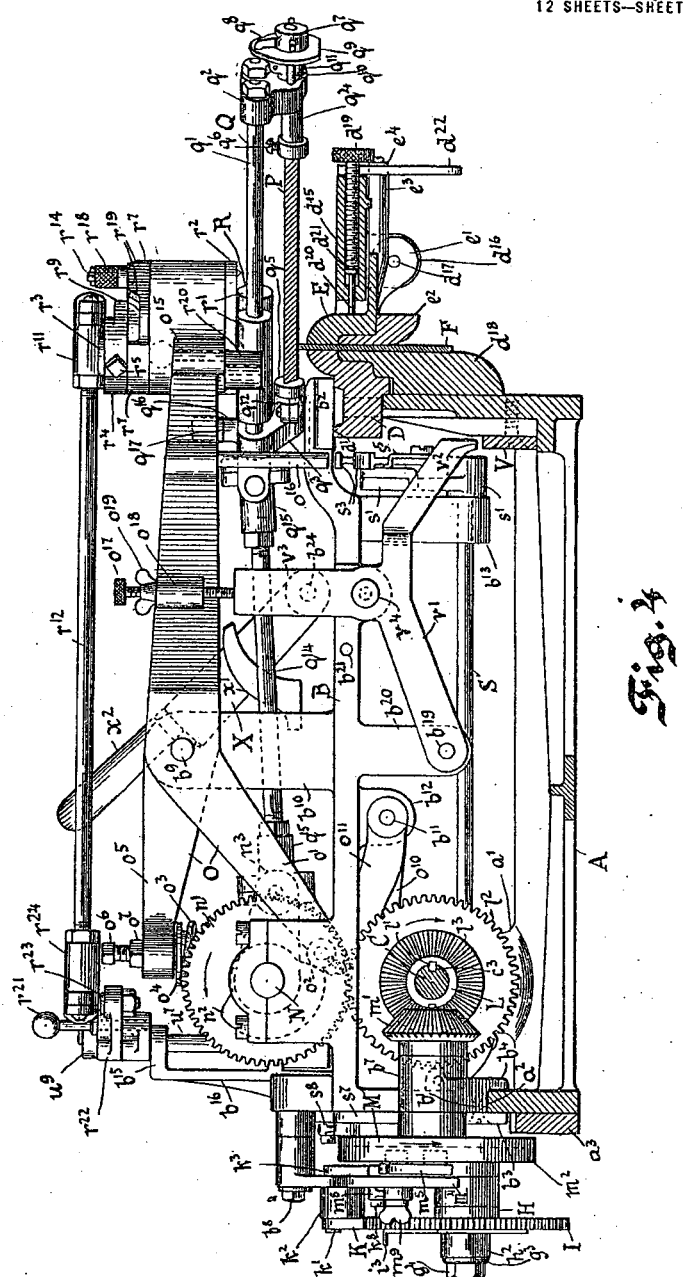

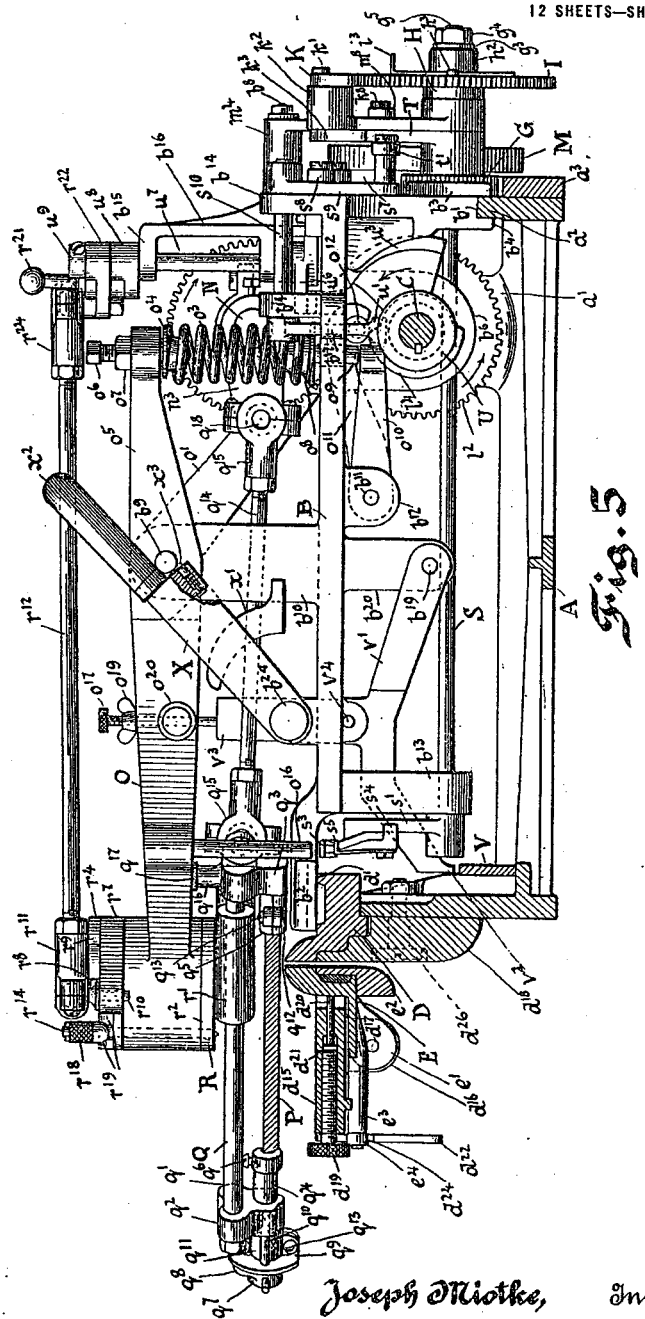

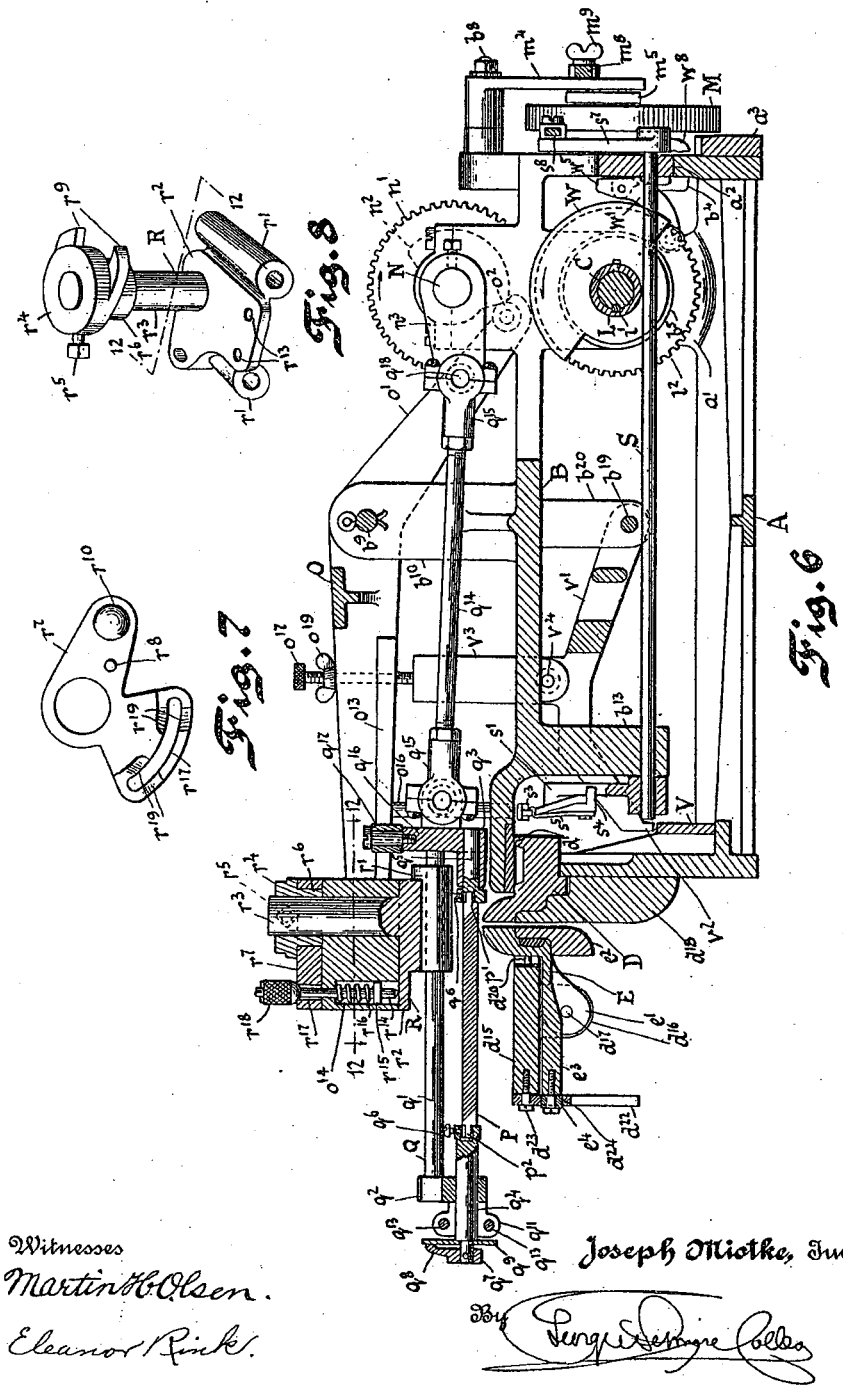

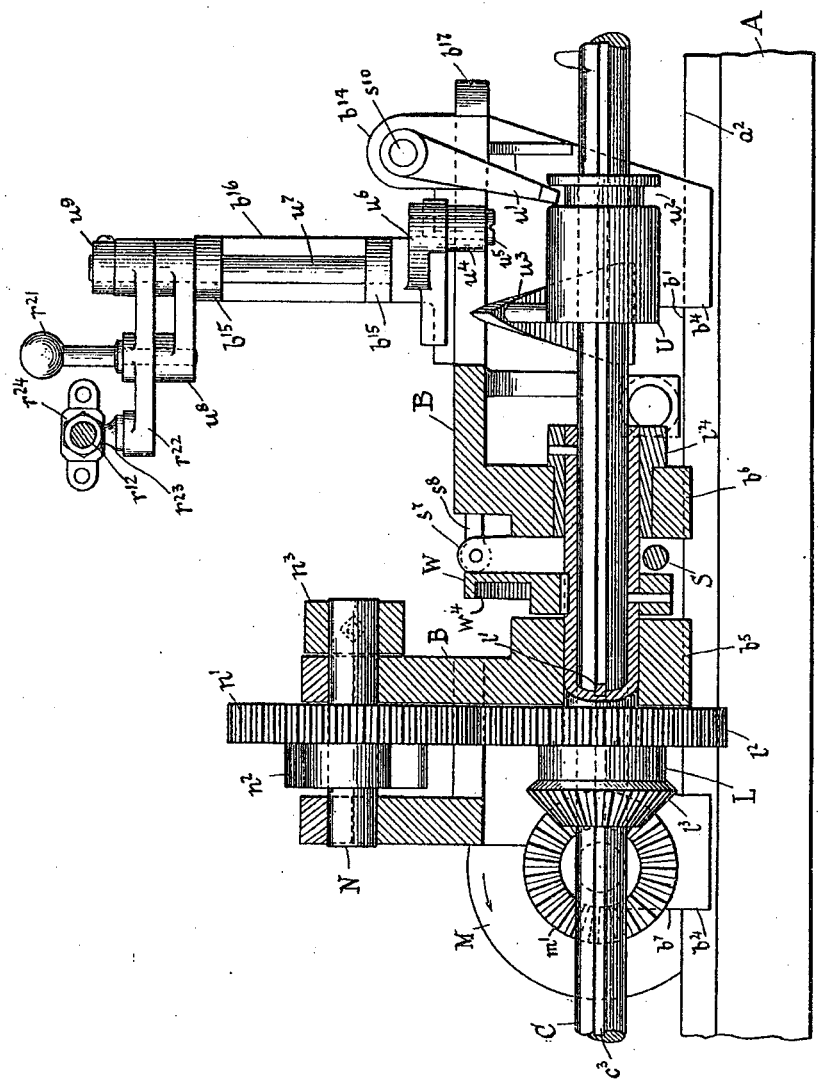

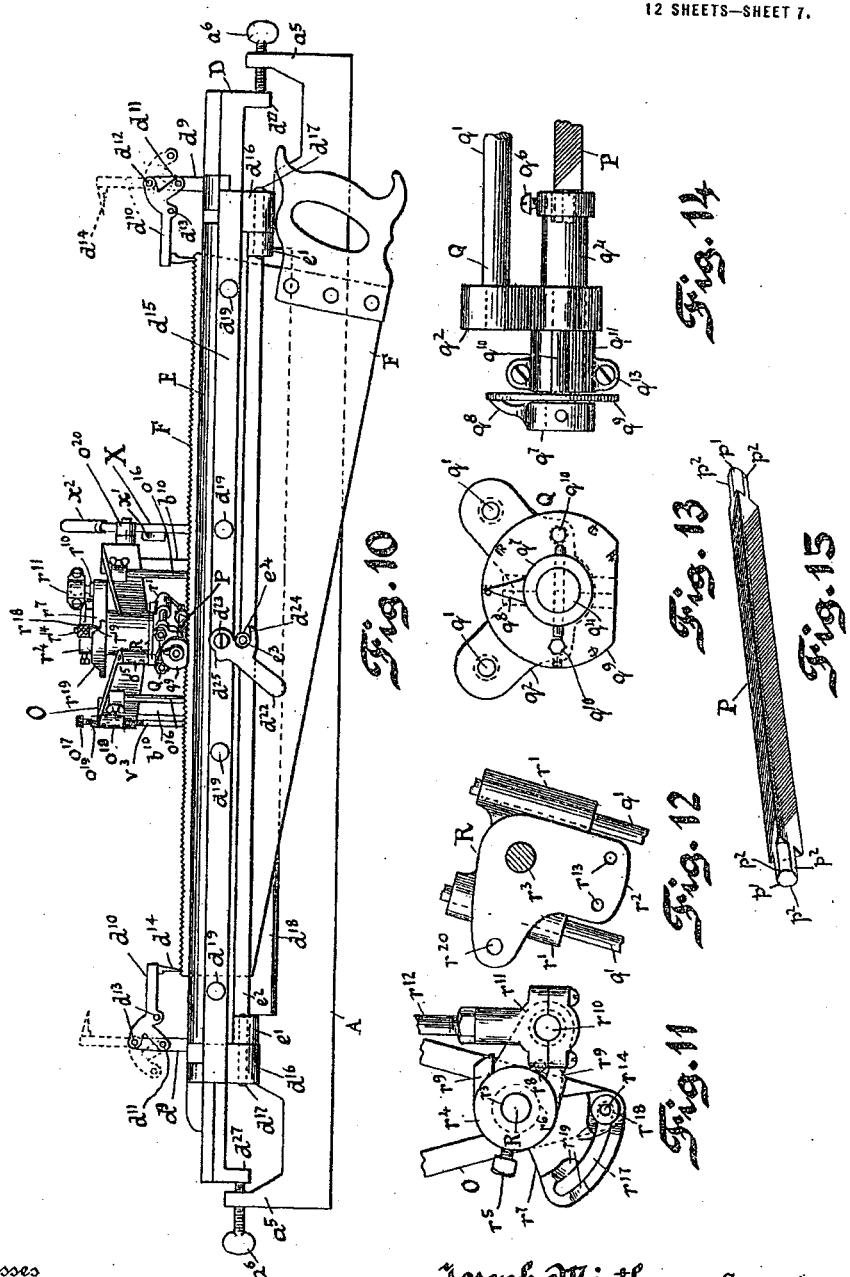

J. MIOTKE.
SAW SHARPENING MACHINE.
APPLICATION FILED DEC. 30, 1912.

1,157,890.

Patented Oct. 26, 1915.
12 SHEETS—SHEET 8.

Witnesses
Martin H. Olsen
Eleanor Rink

Joseph Miotke, Inventor

By
Attorney

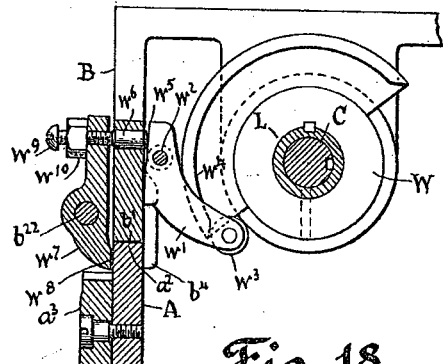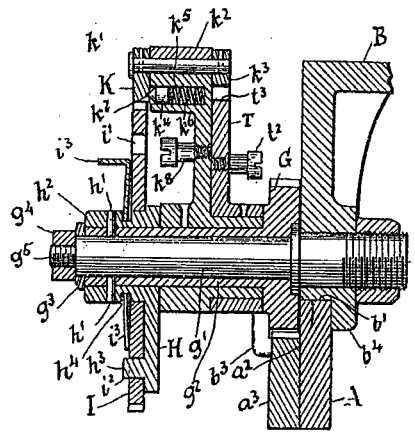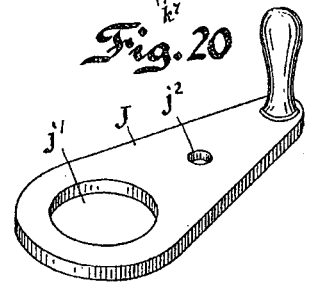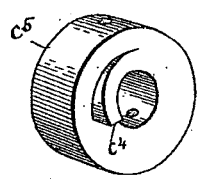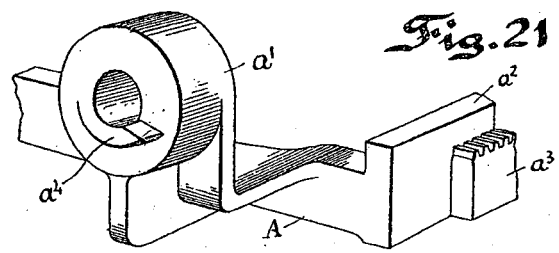

J. MIOTKE.
SAW SHARPENING MACHINE.
APPLICATION FILED DEC. 30, 1912.
1,157,890.
Patented Oct. 26, 1915.
12 SHEETS—SHEET 10.
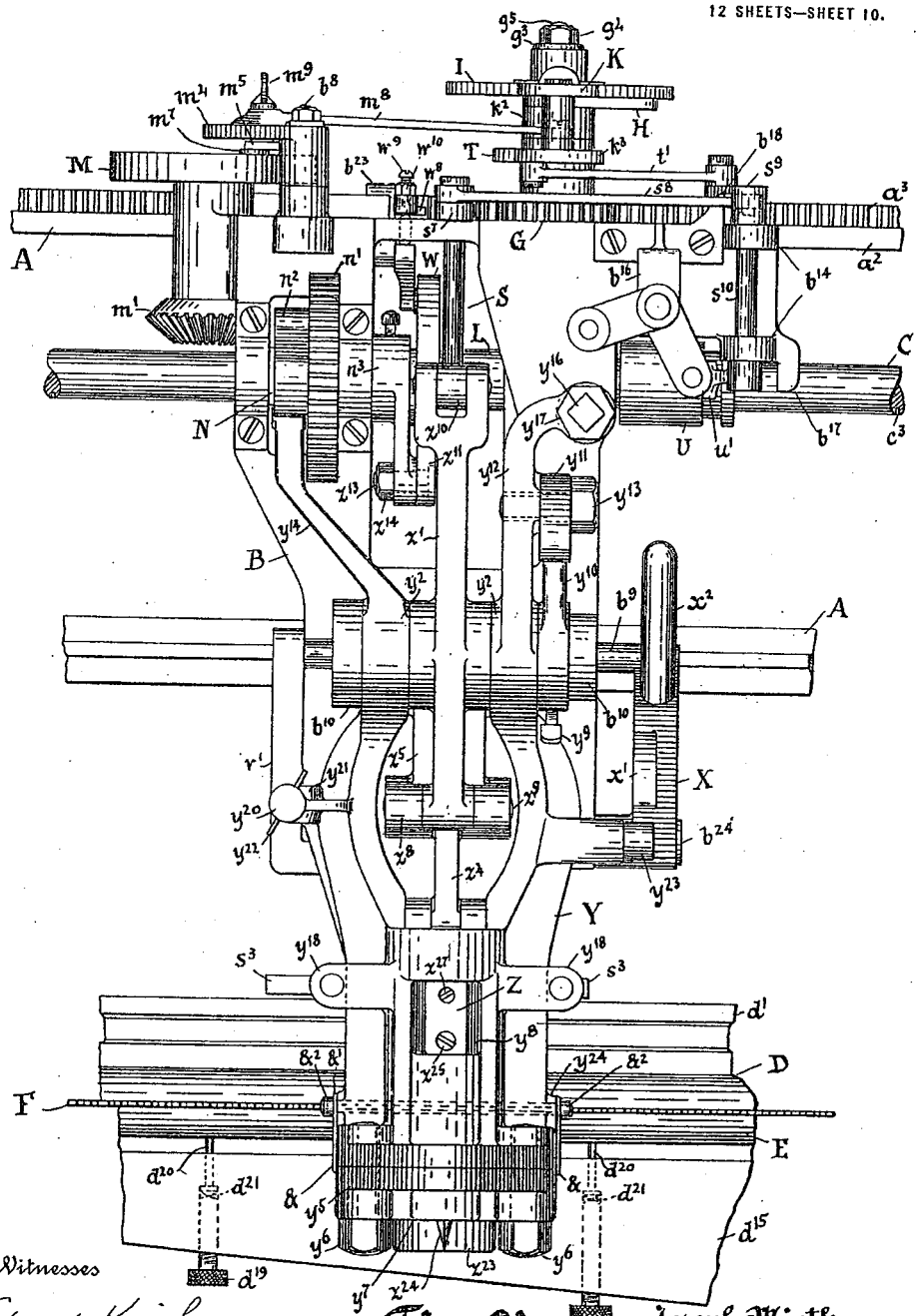

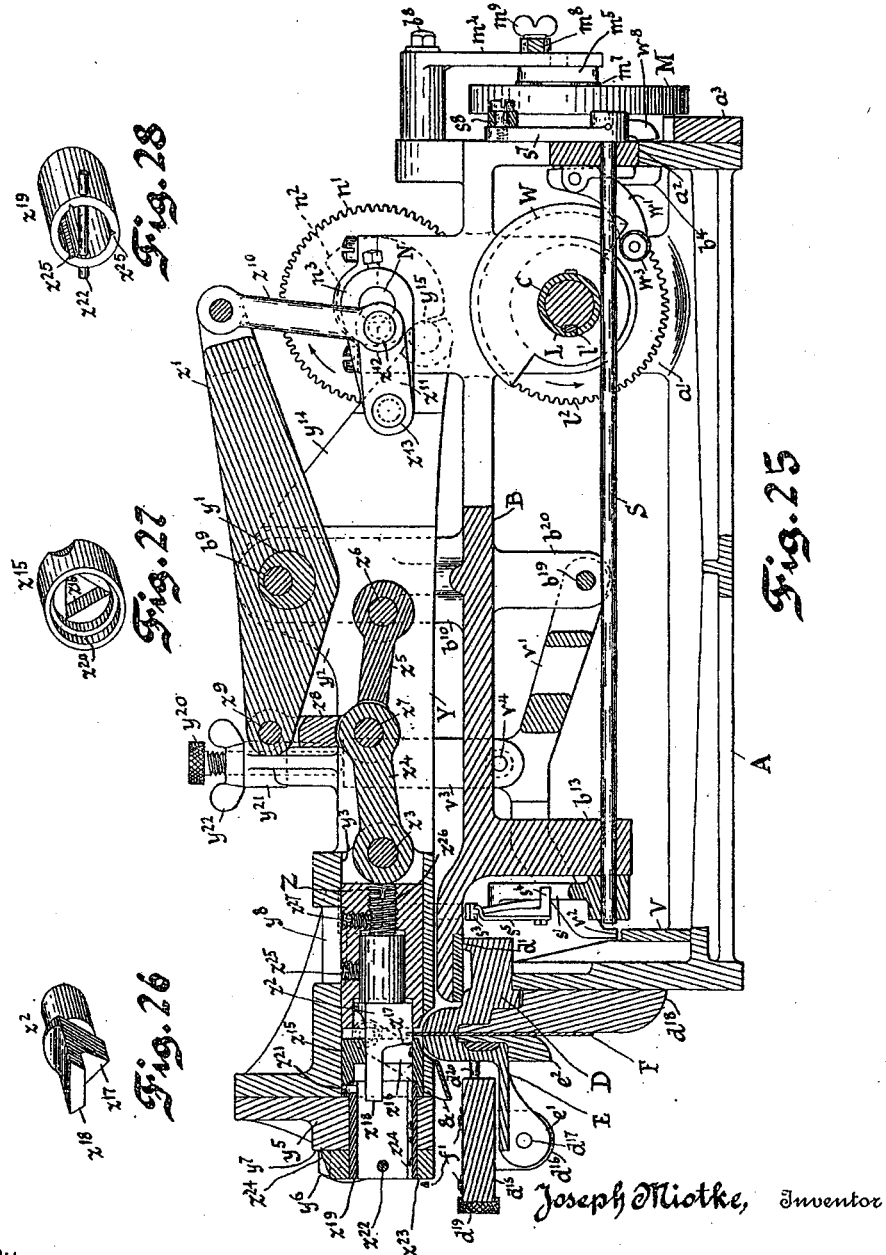

J. MIOTKE.
SAW SHARPENING MACHINE.
APPLICATION FILED DEC. 30, 1912.
1,157,890.
Patented Oct. 26, 1915.
12 SHEETS—SHEET 12.
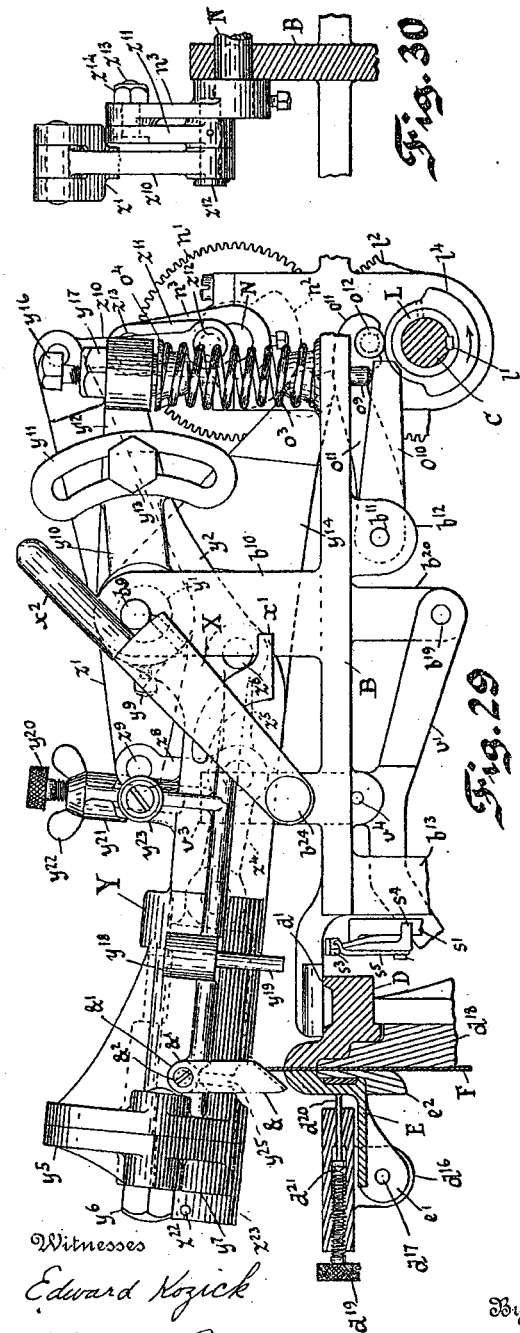
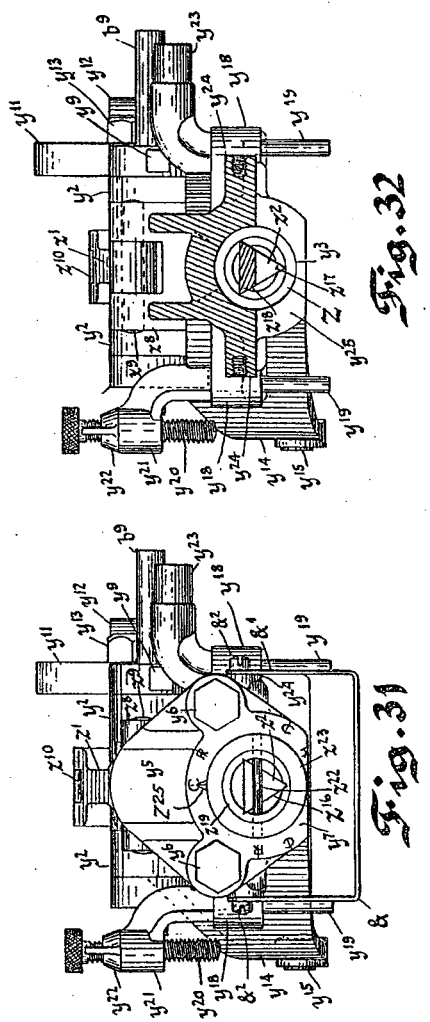
Joseph Miotke, Inventor
Witnesses
Edward Kozick
Eleanor Rink
By Attorney

UNITED STATES PATENT OFFICE.

JOSEPH MIOTKE, OF MILWAUKEE, WISCONSIN.

SAW-SHARPENING MACHINE.

1,157,890.   Specification of Letters Patent.   Patented Oct. 26, 1915.

Application filed December 30, 1912. Serial No. 739,299.

*To all whom it may concern:*

Be it known that I, JOSEPH MIOTKE, of Milwaukee, Wisconsin, have invented a Saw-Sharpening Machine, of which the following is a specification.

This invention relates to devices for sharpening and gumming saws, more particularly hand-saws, and the object which I have in view is to provide a machine which will perform the complete operation without the aid of skilled labor and with greater mechanical accuracy than can be obtained by hand or by means of those machines in which a part of the movements are manually guided and therefore require a certain amount of manual skill.

In sharpening a saw there are three principal essentials to securing a perfect adjustment: First, the teeth must be filed at the correct angle; secondly, the pitch or distance between any two teeth must be exactly the same as between any other two teeth; and thirdly, the points of the teeth must lie in a straight line or (as is more usual) in a long arcuate curve of 28-foot radius. The first point involves two others, namely, the proper angle of the front edge of the tooth with the direction of sawing and the correct diedral angle of the face of the tooth with the plane of the saw. If any one of these several essentials be imperfectly carried out, the saw will not cut properly or perfectly, depending on amount of the lack of adjustment. Hence, it is clear that it is impossible to perfectly cut the teeth by merely manual skill, even where a guide is used for the saw-file as in some existing machines, and moreover this requires skilled labor and takes a large portion of carpenters' time each day in sharpening their saws.

I therefore have in view to provide a machine which, on large work where many carpenters are employed, can be operated by an unskilled hand to continually sharpen saws while the carpenters are entirely relieved of the operation, and further, a machine for use in factories to turn out saws more perfectly edged than is possible with the apparatus heretofore employed.

I also have in view to provide means in connection with my machine for gumming the saw, that is to say, punching out or repunching the teeth of the saw to a fixed and uniform size which shall be accurately regulated by the machine in the same way as the filing is regulated.

My invention embraces in its construction, first, a base-frame having a clamping-device to which a saw can be rigidly secured; adjusting-gages and devices, for adjusting the position of the saw in the clamp vertically and horizontally; a carriage traveling on said base-frame; means for exactly adjusting the travel of said carriage to the pitch of the given saw-teeth for each revolution of the operating-shaft; an oscillating filing-frame detachably mountable on the carriage; an oscillating gumming-frame detachably mountable on the carriage and adapted to be substituted for the filing-frame and to perform similar movements with the exception that the operation performed by it is gumming instead of filing; mechanism on the carriage for raising and lowering the filing-frame or gumming-frame (as the case may be) automatically as the carriage advances: means for causing the file or gumming-dies (as the case may be) to follow in its path the curve of the edge of the saw; devices on the carriage connected with the filing- or gumming-frame (as the case may be) for reciprocating the file or punching-die; devices for automatically reversing the movement of the carriage at the end of its travel, for causing the tool to skip one tooth at each such reversal, and, in the case of the file when used on a saw having alternate teeth filed at opposite diedral angles, for reversing the angular position of the file at each such reversal of the carriage; adjusting devices for different styles, angles and pitches of teeth of different saws; and novel combinations and subcombinations of elements for accessory purposes, as will be hereinafter described and more particularly set forth in my claims.

The nature of my invention will best be understood from a consideration of the accompanying drawings, which show the most improved form thereof. The first twenty-three figures of these drawings illustrate the machine as provided with the filing-attachment; the other nine figures illustrate the gumming-attachment.

Figure 17:
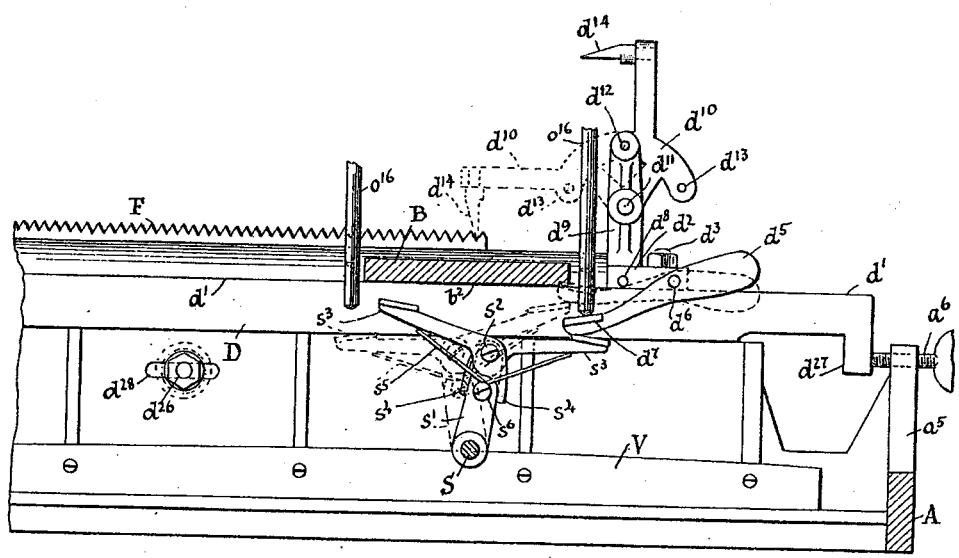

Of the several figures, Figure 1 is a plan view of the complete machine, a part on the right side being broken out to bring the right-hand end within the limits of the sheet; Fig. 2 is a front elevation of the carriage and a portion of the frame adjacent thereto; Fig. 3 is a fragmentary front elevation of the parts shown at the lower left-hand of Fig. 2 with the ratchet feed-wheel removed; Fig. 4 is a side elevation from the left-hand side of the carriage, the base-frame being shown in section; Fig. 5 is a similar elevation from the right-hand side of the carriage, the base-frame being shown in section; Fig. 6 is a longitudinal section through the carriage on the plane 6 (Fig. 1); Fig. 7 is a plan of the shifting cam-plate which actuates the shifting-head of the file-carrier; Fig. 8 is a perspective view of the shifting-head of the file-carrier; Fig. 9 is a transverse section through the carriage taken on the plane 9 (Fig. 1) and looking in the direction of the arrow; Fig. 10 is a front view of the machine (omitting the driving shaft and supports); Fig. 11 is a plan-view of the file-shifting mechanism on a larger scale than the assembled figures; Fig. 12 is a plan-section of the shifting-head separately on the plane 12 (Figs. 6 and 8; Fig. 13 is a front-end view of the file-holder; Fig. 14 is a side elevation of the front end thereof; Fig. 15 is a perspective view of the file; Fig. 16 is a perspective view of the carriage-feed reversing-elements; Fig. 17 is a fragmentary longitudinal section on the plane 17 (Fig. 1), looking from the rear and showing portions of the carriage-reversing mechanism in the act of reversing; Fig. 18 is a transverse section through the carriage and frame on the broken plane 18 (Figs. 1 and 2), looking in the direction of the arrow and illustrating only the carriage-clamping devices; Fig. 19 is a longitudinal vertical section through the front portion of the carriage on the plane 19 (Fig. 2), illustrating only the construction of the ratchet feed-mechanism. Fig. 20 is a perspective view of the ratchet feed-pawl; Fig. 21 is a perspective view of the crank for manually advancing the carriage; Figs. 22 and 23 are perspectively views of the inter-engaging cam-devices for shifting the operating shaft longitudinally. All the foregoing figures illustrate the machine with the parts assembled for filing; those following illustrate it as prepared for gumming; and of these Fig. 24 is a plan view of the carriage and part of the base-frame; Fig. 25 is a longitudinal central section thereof looking toward the left; Figs. 26, 27 and 28 are perspective views of the punch-die and tail-piece of the latter, respectively; Fig. 29 is a side elevation from the left side of the gumming frame and a portion of the carriage, showing the former in raised position; Fig. 30 is a rear elevation of certain driving-parts at the right of Fig. 29, the supporting portion of the carriage frame being shown in section on the axis of the driving-shaft; Fig. 31 is a front end view of the gumming-frame as seen in Figs. 24 and 25; and Fig. 32 is a transverse section thereof taken in the plane of the saw. In Fig. 6 alone the file is shown in the central or right angle-position; in the remaining figures, in the acute-angle position of advance toward the right of Fig. 1.

The reference letters refer each to the same part in each figure of the drawings.

The machine comprises, first, a generally rectangular base-frame designated A, which is stationary and rests on any suitable support; secondly, a carriage, the frame whereof is designated B, running on said frame from end to end thereof, as shown in Fig. 2; thirdly, a driving- or operating-shaft C turning in bearings $a^1$ on the frame, and having a hereinafter-specified engagement with the carriage for the purpose of moving it from end to end and operating the various mechanisms carried thereby, said shaft C being provided with adequate means for revolving the same, here represented by a crank $c^1$ mounted on the overhanging left-hand end thereof and provided with a handle $c^2$; fourthly, a saw-clamping and supporting mechanism, the same comprising a longitudinally adjustable stationary element or fixed-jaw D and a movable clamping-jaw E, between which, in Figs. 1 and 10, is shown clamped the saw F; fifthly and sixthly, a filing-frame O and a gumming-frame Y; with appropriate connections and features, each of which will be described in order.

The base-frame A and the coacting stationary element D are provided with parallel runways $a^2$ and $d^1$ and the carriage-frame B is provided with runners $b^1$ and $b^2$ sliding on these runways and with plates $b^3$ and lugs $b^4$ on opposite sides on the runway $a^2$, so as to guide against lateral displacement. Upon the outer side of the runway $a^2$ is also secured a rack $a^3$ with which engages a spur-gear G, which is pivoted upon a stub-shaft $g^1$ carried by the carriage, and it is actuated by the feed-mechanism which is illustrated in detail in Fig. 19 and will now be described. The wheel G has projecting from one face thereof a long sleeve $g^2$, which itself turns freely upon the shaft $g^1$ and has mounted thereon several elements, one of which, a rock-arm H, is keyed thereto by two pins $h^1$, passing through the extended hub $h^2$ thereof. The members G and H therefore turn together as one piece, freely upon the shaft $g^1$, being held against displacement by a washer $g^3$ and nut $g^4$ mounted on a threaded stud $g^5$ on the end of shaft $g^1$. The hub $h^2$ is cylindrical and adapted to receive the ratchet feed-wheel I, which has two holes $i^1$ and $i^2$ (Fig. 2) in its face adapted to receive the cylindrical lug $h^3$ on the end of the arm H. It is of importance to note that one of these holes, the hole $i^1$, is circular, and exactly fits the lug $h^3$, so that there is no lost motion between them; but the other hole, $i^2$, is elongated in a circumferential sense so that the pin $h^2$ shall have an amount of lost motion exactly corresponding to the distance between two teeth on the saw which is being filed. The ratchet-wheel I is removably held in place upon the arm H by a forked spring-plate $i^3$, the legs of which are received in an annular groove $h^4$ in the hub $h^2$, so that the wheel I can be instantly removed by withdrawing this plate and a wheel of another size put in its place; or when it is desired to advance the carriage by hand, the wheel I is replaced by hand-crank J, having cylindrical holes $j^1$ and $j^2$ adapted to fit the hub $h^2$ and lug $h^3$ respectively.

The mechanism for feeding or advancing the carriage step by step, each step being equal to the pitch of the saw teeth, or double the pitch, consists of a double-nosed ratchet-pawl K pivoted upon a pin $k^1$ passing through the end of a swing-arm $k^2$ and freely movable therein. The pin $k^1$ has the pawl K keyed on one end and a double armed dog $k^3$ keyed on the other end, so that the two swing together. The dog $k^3$ is for the purpose of reversing the position of the pawl as will be described later. The pawl K is adapted to feed or advance the wheel I in one direction or the other according as it stands with one nose or the other in contact with said wheel, and in each of these two positions it is resiliently maintained by a conical-ended pin $k^4$ which is seated in a recess $k^5$ in the swinging arm $k^2$, and is pressed against the back face of the pawl K by a coiled compression-spring $k^6$ behind it. The back face of the pawl has two depressions $k^7$, on opposite sides of the center line, so placed as to receive the conical end of the pin $k^4$, said end being seated in one or other depression according to the position of the pawl and give to the pawl sufficient resiliency to click over the teeth of the ratchet-wheel I.

The swinging arm $k^2$ is reciprocated, that is to say, given one forward and one backward stroke, for each revolution of the shaft C by the following mechanism: The shaft C has along the greater part of its length a groove or keyway $c^3$. Journaled upon the carriage-frame B, in lugs $b^5$ and $b^6$ thereof (see Fig. 9), is a member L, which has a key $l^1$ engaging in the keyway $c^3$, so that the rotation of the shaft causes the member L to rotate but leaves it free to slide along the shaft. The member L carries a spur-gear $l^2$ and a bevel-gear $l^3$, the latter engaging with the beveled gear-teeth $m^1$ of a member M journaled in a lug $b^7$ on the frame B at right-angles to the shaft C. The member M (Fig. 4) carries on its outer end a face-cam $m^2$, which has in it a groove $m^3$ (Fig. 2) of suitable shape to reciprocate the swinging member $m^4$, which is pivoted upon a pin $b^8$ on the carriage-frame, and has journaled thereon a bar $m^5$ turning on a pin $m^6$ and carrying on its ends two cam-rollers $m^7$ which move in said cam-groove $m^3$. It is not essential that there should be two cam-rollers, but these are provided to give greater smoothness of action. The swinging member $m^4$ is connected with the swinging-arm $k^2$ by a link $m^8$ journaled on a pin $k^8$ on said arm and on another pin $m^9$ which is provided with a screw-thread adapted to screw into any one of a set of holes $m^{10}$ in the member $m^4$, said pin $m^9$ being also provided with a winged head as shown for readily removing and resetting it. Opposite the holes $m^{10}$ may be placed index numbers $m^{11}$ which correspond to the holes and indicate the "points per inch" of the saw which is to be sharpened. Now it will be seen that the arm $k^2$ and hence the pawl K will be given a greater or less amplitude of swing according as the pin $m^9$ is set in one of the lower or upper holes of the member $m^4$. Such different amplitudes of swing correspond to the respective pitches of a set of ratchet-wheels I, similar in shape to the one shown in the drawings but having each a special pitch corresponding to the different saw-pitches.

The actual filing of the saw comprises two movements: one to advance and retract the file, the other to raise the file from the saw on the return-movement and lower it on the advance-movement. Both are operated by means of a shaft N, which is continuously driven by a spur-gear $n^1$ engaging with the gear $l^2$ and having the same size, so that each revolution of the shaft C is accompanied by one of the shaft N. Journaled on the frame B of the carriage, and on a pin $b^9$ passing through two upstanding lugs $b^{10}$ at opposite sides thereof, is an oscillating frame O herein termed the filing-frame in contradistinction to the gumming-frame described later. The frame O is generally A-shaped as shown in Fig. 1, having at its apex the file-holding and -shifting mechanism, and having one leg $o^1$ extended to proximity with the shaft N and provided with a cam-roller $o^2$, which is engaged and depressed once in each revolution by a cam $n^2$ on the shaft N. This gives the frame O an oscillating movement, raising it mechanically and permitting it to drop by gravity. In order, however, to assure the depression of the saw-file to the gage-limit during the filing-movement, I prefer not to depend upon gravity alone but to positively depress the frame O by a spring $o^3$ pressing against a conical cap or seat $o^4$ on the under side of the other arm $o^5$ of the frame O, and being preferably provided with a set-screw $o^6$ and lock-nut $o^7$ for adjusting the force of the spring. The lower end of the spring $o^3$ is seated upon a reciprocating seat-member $o^8$ (Fig. 5), which has a pin $o^9$ passing through a hole in the frame B, and the lower end of this pin is supported by one arm $o^{10}$ of a forked cam-lever, journaled at $b^{11}$ upon a lug $b^{12}$ of the frame B; and the other arm $o^{11}$ of said lever has a roller $o^{12}$ which rests upon and is actuated by a cam $l^4$ (Figs. 9 and 29) keyed upon the sleeve-end of the member L, the action of which cam is to raise the seat $o^8$ of the spring coincidently with the depression of the file, and lower it again when the cam $n^2$ raises the front end of the filing-frame O, thus bringing the pressure of the spring to bear only in the depressed position of the file or tool.

The file in my machine, P, shown separately in Fig. 15, is of special shape adapted to be received in a holder Q, which latter reciprocates in a shifting-head R journaled in the apexed front end of the frame O, so that the file and its holder can be held either in a position at right angles with the saw-blade, which would be suitable for a rip-saw, or at an acute-angle with the plane thereof, which would be suitable for a crosscut-saw; the acute angle being alternately on one side and on the other of the blade. The file-holder Q is constructed with two parallel bars $q^1$ sliding in sockets $r^1$ (Figs. 8 and 12) and connected at their ends by heads $q^2$ $q^3$, which provide also journals to receive two chucks $q^4$ $q^5$, these latter being accurately in line and being provided with accurately centered bores to receive the turned ends $p^1$ of the file P. It is essential to the correct working of the machine that the centering of the chucks, and also the centering of the file-journals $p^1$ on the file P, be accurate, said journals being turned as shown so as to be coaxial with the file itself, and having three flats $p^2$ which are extensions of the filing-surfaces of the file. The object of these flats $p^2$ is to permit the file P to be clipped by means of set-screws $q^6$ in such a position that the upper side of the file shall be accurately horizontal, in other words so that the two filing sides may form equal angles with a vertical plane. In this manner it is possible to have the file exactly in the same position with respect to the saw, no matter which one of the three surfaces is turned up. The chuck $q^4$ passes through the head $q^2$ (Fig. 14) and has keyed to its end a collar $q^7$ having an index-finger $q^8$ which is read upon a disk $q^9$ (Figs. 13 and 14) mounted on the ends of two posts $q^{10}$ supported by the head $q^2$. The disk $q^9$, as shown, has three marks 120° apart designated "C," in each of which the upper face of the file is horizontal, these indicating the positions of the pointer for filing a crosscut-saw; and three similarly spaced marks designated "R," which indicate the positions of the pointer for filing a rip-saw, in which the upper face of the file is tipped through an angle of about 30°. Other marks may of course, if desired, be provided to show different angles at which the faces of the file are to be set in case it is desired to use any other angles, or the disk $q^9$ may be regularly graduated in degrees. In order to hold the chucks $q^4$ and $q^5$ in the positions in which the file is set, the heads $q^2$ and $q^3$ are provided with split-bearings $q^{11}$ and $q^{12}$, the two halves of which are drawn together upon the chucks by screws $q^{13}$.

The reciprocation of the holder Q is effected by means of a crank $n^3$ on the end of the shaft N, and a link $q^{14}$ connecting said crank with the head $q^3$, there being ball-joint end-pieces $q^{15}$ on each end of the link because the holder Q has the angular shifting movement hereinafter referred to. Further, in order to form a bearing for the head $q^3$ against the lateral thrust of the link $q^{14}$ when the file stands at an angle to the saw, I provide an upright post $q^{16}$ (Figs. 1, 2 and 6) mounted on said head $q^3$ and carrying a roller $q^{17}$ which rolls upon one of the two rails $o^{13}$ formed on the frame O. The ball-ended crank-pin $q^{18}$, which connects the crank $n^3$ with the link $q^{14}$ and forms the other member of the ball-joint, is provided with a screw-stud $q^{19}$ passing through a hole in the crank and a nut $q^{20}$ by which it is secured thereto so that in removing the filing-frame this pin $q^{18}$ is removed along with it.

The shifting-head R is arranged to hold the angle of the reciprocation of the file in three different positions as aforesaid, namely, at right angles to the saw-blade and at an acute angle therewith on opposite sides of the right-angle position. The shifting-head R comprises (Figs. 8 and 12) the plate $r^2$, which carries the parallel sockets $r^1$; the shaft $r^3$, which is journaled in the apex of the frame O as shown (Fig. 6), and a collar $r^4$ mounted on the upper end of the shaft $r^3$ and secured thereto by a set-screw $r^5$. The collar $r^4$ has a hub-sleeve $r^6$ on which is journaled a shifting cam-plate $r^7$ (Figs. 7 and 11), which carries a stud $r^8$ adapted to engage alternately with two lugs $r^9$ on opposite sides of the collar $r^4$ and set at such a distance as to give a certain amount of lost-motion for the stud $r^8$ in passing from one to the other. The plate $r^7$ has further a spherical lug $r^{10}$ at one side of the pivot, with which is connected the ball-joint end-piece $r^{11}$ of a link $r^{12}$, the purpose of which is to throw said shifting-plate over in the manner hereafter explained. In the front end of the plate $r^2$ are formed two holes $r^{13}$, which subtend with the axis of the shaft $r^3$ the angle through which the shifting-head R, holder Q and file P are shifted in passing from one acute-angular position to the other: in other words, double the angle which the file makes with the plane of the saw. With these holes $r^{13}$ engages a pin $r^{14}$ which has a reciprocating movement in the end of the frame O, being provided with a collar $r^{15}$ seated in a recess $o^{14}$, and a coiled compression-spring $r^{16}$ is placed behind the collar $r^{15}$ to force the pin into one of the holes $r^{13}$ whenever it registers therewith. The upper end of the pin $r^{14}$ passes through an arcuate slot $r^{17}$ in the plate $r^7$, and it carries a head $r^{18}$ above said plate, said head being preferably milled so that the pin $r^{14}$ can be conveniently raised when the head is to be shifted manually. For shifting the head automatically, the plate $r^7$ has at each end of the arcuate slot $r^{17}$ an oblique cam-surface $r^{19}$, which is adapted to engage the bottom of the head $r^{18}$ and raise the pin $r^{14}$ out of one of the holes $r^{13}$ whenever the plate $r^7$ is shifted from one side to the other, and for this purpose the head $r^{18}$ is preferably given a curved shape on its lower end, as shown in Fig. 6.

It will be observed that between the two cam-surfaces $r^{19}$ on the plate $r^7$ is a flat space, during the passage of which under the head of the pin $r^{14}$ the latter is held raised, and it is during this interval that the projection $r^8$ acts on one of the lugs $r^9$ to shift the head through the desired angle. In other words, the shifting is effected by moving the plate $r^7$ from one extremity of its travel to the other, which effects the following series of movements: The cam $r^{19}$ on the plate $r^7$ first raises the pin $r^{14}$ out of the hole $r^{13}$ in which it is seated, during which time the head R is stationary. When this has been effected, the projection $r^8$ strikes the lug $r^9$ and during the remainder of its angular movement turns the head R, file-holder Q and file P with it, this turning movement being continued until the pin $r^{14}$ drops into the opposite hole $r^{13}$, in which position the parts are then locked until the shifting-movement is reversed.

For holding the file in its middle or right-angle position no shifting movement is provided, since the file occupies the same position for all the teeth. The shifting-head R is locked in this position by means of two superposed perforated lugs $o^{15}$, $r^{20}$ (Figs. 1, 4, 8 and 12), and a pin $r^{21}$, which is placed through the apertures in both. This pin $r^{21}$ is shown in the drawings as occupying another position, in which the link $r^{12}$ is locked fast to the automatic shifting-mechanism, from which of course it is necessary to unlock it when in the right-angle position previously indicated.

As it will be understood that a crosscut-saw has successive teeth filed at opposite angles, it would be necessary if the successive teeth were filed in order that the angular position of the file should be reversed at each stroke. In order to avoid the necessity of this, my machine is constructed to file only alternate teeth, for which the position of the file is the same. On its forward movement it files one set of alternate teeth, for which the position of the file is as shown in Fig. 1; and on its return-movement it files the other set, in which the file occupies the opposite position. It is necessary, therefore, in order that the machine may be perfectly automatic, to provide means at the end of the forward movement for, first, shifting the angle of the file, secondly, reversing the direction of feed, and thirdly, giving the carriage an initial advance of only one tooth instead of two teeth, which is the normal feed of the carriage. These means will now be described.

The primary reversing devices are illustrated separately and more particularly in Figs. 16 and 17. A main reversing-shaft S extends from front to rear of the carriage, and is supported in bearings on the frame B, a lug $b^{13}$ being provided at the front end of the carriage for this purpose. On the front end of the shaft S is mounted a rock-arm $s^1$; and on the upper end of this arm, upon a pin $s^2$, are pivoted two extension-members thereof $s^3$, having each a platen-shaped end as shown in Fig. 16. These extension-members $s^3$ extend laterally to opposite sides of the arm S, and have abutment heels $s^4$ which limit their upward movement; and a stiff-spring $s^5$ is provided, the middle of which is supported on a screw $s^6$ and the two ends press up upon the extension-members $s^3$ so as to hold them in their raised positions. At opposite ends of the runway $d^1$ are placed two shiftable blocks $d^2$ secured in adjustable positions by bolts $d^3$ passing through slots $d^4$ in the runway. These blocks $d^2$ support dogs $d^5$ which are pivoted at $d^6$; each dog having a platen-shaped finger $d^7$ which extends a certain distance toward the carriage. The other end of the dog is overweighted as shown, so that the dog rests normally in a horizontal position indicated by the dotted-line position of Fig. 17, resting against the abutment-pin $d^8$.

On the filing-frame O of the carriage are secured two vertical bars $o^{16}$, which depend into a position immediately over and into proximity with the platen-shaped ends of the extension-members $s^3$ but not low enough so as to touch these members. Therefore the operation of the reversing-shaft will not be effected thereby until the carriage has reached the end of its travel, where one of the bars $o^{16}$ will, in its vertical oscillation, strike the finger $d^7$ of the corresponding dog $d^5$, depressing this finger, and the latter in turn strikes the end of the extension-member $s^3$ which is immediately under it, thus throwing the rock-arm $s^1$ and the shaft S over in that direction, namely, to the opposite side from where it was. This reversal of the shaft will take place at each end of the travel of the carriage. The spring $s^5$, it should be observed, is stiff enough to prevent the extension-member $s^3$ from turning on its pivot $s^2$ during such reversal, but yields in case the downward movement of the bar $o^{16}$ carries it beyond the limit of movement of the shaft S, for which fixed stops, hereinafter described, are provided.

On the rear end of the shaft S is a second rock-arm $s^7$, which is connected by a link $s^8$ to a third rock-arm $s^9$, which is mounted upon and secured to a rock-shaft $s^{10}$ journaled in a pair of lugs $b^{14}$ of the carriage. The rock-arm $s^9$ is also connected by a link $t^1$ to a pin $t^2$ on a cam-arm T, which is journaled upon the sleeve of the swinging arm $k^2$, as shown in Fig. 19. The upper end of the cam-arm T is provided, as clearly illustrated in Fig. 3, with a curved cam-edge $t^3$, whose function is to engage one of the two legs of the dog $k^3$ so as to throw over the pawl K from one side to the other and thereby reverse the feed of the wheel I as previously explained. The rock-shaft $s^{10}$ is provided on its opposite end, as seen more particularly in Figs. 5 and 9, with a swinging arm $u^1$ which engages in a groove $u^2$ of a sliding-block U, this block being keyed in a slidable manner to the shaft C in the same manner as the member L. The block U carries a wedge-shaped reversing-cam $u^3$, the office of which is to engage on one side or the other, a cam-roller $u^4$ mounted on a pin $u^5$ on the end of a rock-arm $u^6$ carried by a rock-shaft $u^7$, and throw these parts over in the corresponding direction. The shaft $u^7$ is vertical and journaled in lugs $b^{15}$ on a post $b^{16}$, which is secured to and forms substantially a part of the carriage-frame B. On its upper end the rock-shaft $u^7$ carries another rock-arm $u^8$, which is keyed thereto, and on top of that a longer arm $r^{22}$, which is loose thereon and is kept in place by a collar $u^9$ on the end of the shaft. The rock-arm $r^{22}$ has on its end a spherical lug $r^{23}$, which articulates with a ball-joint end-piece $r^{24}$ on the rear end of the link $r^{12}$. The two rock-arms $u^8$ and $r^{22}$ are provided with coregistering perforations which are fitted by the pin $r^{21}$, and as previously indicated this pin is inserted in these perforations to lock the two arms together whenever the saw-file is to be worked in the angular position.

Limiting stops $b^{17}$ and $b^{18}$, the former on the frame B in position to be struck by the arm $u^1$ on the reversal in one direction, the latter on the base of the member $b^{16}$ in position to be struck by the arm $s^9$ on the reversal in the other direction, are provided for the shaft S and the train of elements operated thereby, including the cam U and ending with the file P. These stops are made necessary because of the variable vertical oscillation of the frame O (hereinafter explained); so that the minimum oscillation causes the complete reversal of the shaft S, and any excess above said minimum is taken up by the springs $s^5$.

It is well understood that the edges of hand-saws are generally made not on a straight line but on an arc of large radius. In order to provide for this curvature it is therefore necessary that the file should travel, not in a straight line from end to end, but on a corresponding curved line. To provide for this, I have provided my machine with a guide-bar V secured to the inner side of the front of the frame parallel with the position of the saw, the upper edge of this bar being given a curvature exactly identical with that which the saw has or which it is intended to give it. With this guide-bar coöperates a lever $v^1$ pivoted upon the pin $p^{18}$ mounted in a pair of depending lugs $b^{20}$ carried by the frame B, this lever having a nose $v^2$ which is adapted to rest upon the bar during the travel of the carriage. The lever $v^1$ is provided with an upright extension $v^3$, the upper end of which is directly beneath the end of a set-screw $o^{17}$ mounted in a threaded lug $o^{18}$ on the frame O and locked in place by a wing-nut $o^{19}$. It is obvious now that the striking of the set-screw $o^{17}$ upon the end of the extension $v^3$ limits the depression of the frame O during the filing-movement, and thereby the file is caused to follow in its movements the shape of the upper edge of the bar V.

In cases where it is desired to have the saw file a straight edge, the member $v^1$ is supported free of the bar V by means of a pin $v^4$, which is inserted in registering apertures in the lever $v^1$ and frame B, the pin being shown as in place in the drawings. When the lever $v^1$ is not in use the pin $v^4$ may be placed for safe-keeping in any convenient aperture $b^{21}$.

In order to prevent the carriage from being moved by the reaction of the file during the filing-operation, I also provide a clamp which firmly secures the carriage to the base or bed of the machine while the file is advancing, releasing it again at the end of the movement of the file so as to permit the carriage to be advanced by the feed-mechanism during the return-movement of the file. This clamping-device, illustrated particularly in Fig. 18, comprises a cam W actuating a cam-lever $w^1$, which is pivoted at $w^2$ on the inner side of the carriage-frame, and carries a roller $w^3$ which is engaged by the internal cam-edge $w^4$ of the cam, this cam-edge extending half-way around the cam so that during this interval the lever $w^1$ is raised. The raising of the lever $w^1$ has the effect that the heel $w^5$ thereof presses upon a short pin $w^6$, which is loose in a cavity in the frame B, and forces it out. On the outer side of the frame and upon a pin $b^{22}$ mounted on a block $b^{23}$ on the frame is pivoted the clutch-dog $w^7$, whose lower end $w^5$ is formed to press against the edge of the frame A adjacent to the runway $a^2$ when the upper end is pushed against by the pin $w^6$. A set-screw $w^{6}$ and lock-nut $w^{10}$ enable the clamping pressure to be adjusted.

In order that the oscillating frame may be raised by hand, so that the file can be adjusted without touching the saw, while the latter is in place, I provide a manual lever X which is pivoted at $b^{11}$ upon the frame B and carries a cam-edge $x^1$ for engaging a roller $o^{20}$ on the side of the frame O. A handle $x^2$ is also provided, which rests upon the end of the pin $b^9$ when not in use. To guard this lever against accidental displacement I prefer to provide a conical-ended spring-pin $o^4$ which is adapted to releasably engage the pin $b^9$.

Describing now the operation of the machine, as thus far described, the following is the sequence of movements: Assuming that the shaft C is uniformly rotated, this will give a corresponding uniform rotation to the members L and U which will be communicated by the gearing to the members M and N. The former member, through the cam $m^1$, will communicate an oscillation to the swinging member $m^4$, the link $m^3$, the swinging arm $k^2$ and the pawl K. The latter in turn will on its forward movement click idly over the teeth of the wheel I, and on its return-movement will advance the same a fixed distance depending on the pitch of the wheel-teeth and its amplitude of movement, which is determined by the position of the pin $m^2$; and by means of the gear-connection G—$a^5$ will advance the carriage through a corresponding distance, such a distance equal in the case of a rip-saw to the pitch of its teeth and in the case of a crosscut-saw to double the pitch. When the carriage has been advanced and the pawl K starts on its return movement, the cam W causes the dog $w^7$ to clamp the carriage against the frame and hold it so clamped until the next feed-movement begins.

At the beginning of the feed-movement above described, the cam $w^2$ raises the filing-frame O and holds it raised, while the crank $n^1$, passing the dead-point shown in the drawings, retracts the file-holder Q and the file P. At the end of the feed-movement, the cam $w^2$ lowers the frame O, whose movement is limited by the abutment screw $o^{11}$, which follows the curved edge of the cam-bar V, said frame O being held firmly against the work by the spring $o^1$; and the crank $n^2$ now advances the file P and holder Q, causing the former to take the stroke upon the saw-tooth against which it lies. As the file-movement is finished, the carriage is unclamped and the next feed-movement begins, and this cycle of operations continues until the last tooth is reached, when the automatic reversing-movement takes place. The bar $o^{14}$, striking upon the dog $d^1$, and the latter on finger $s^8$, throws over the rock-arm $s^1$, shaft S, arm $s^7$, link $s^3$, arm $s^9$, shaft $s^{10}$, the cam-shifting arm $u^1$, and the cam-block U; this brings the cam $u^3$ carried by the latter on the opposite side of roller $u^4$, and as it revolves it throws over the latter into the reverse position; the roller $u^4$ carries with it rock-arm $u^5$, shaft $u^6$ and arm $u^7$. Assuming a crosscut-saw is being filed, this movement, by the pin-connection $r^{21}$, shifts the arm $r^{22}$, and by the link-connection $r^{13}$ throws the shifting plate $r^1$, which first withdraws pin $r^{14}$ from the shifting-head R and then throws over the latter, carrying with it file-holder Q and file P. Pin $r^{14}$, released, drops into the hole $r^{15}$ and locks the shifting-head. The file is now in a position to file the alternate teeth of the saw which were skipped on the first time over. At the same time that this shifting-movement is accomplished, the movement of the arm $s^9$, by means of the link-connection $t^1$, throws over the cam-ended arm T, which in turn throws over the dog $k^3$ and pawl K. The feed will now be in the opposite direction. Now in case a rip-saw is being filed the stud $k^5$ fits in the hole $i^1$, and there will be no lost motion, so that the reverse-movement will begin with the next tooth to where it left off, the same teeth being filed a second time. But in case a crosscut-saw is being filed, the stud $k^5$ is in the hole $i^2$, which is slotted out sufficiently so that in reversing there is a lost motion between the arm H and wheel I exactly equal to the pitch of the saw-teeth; so that the first tooth filed on the reverse-movement will be not the next alternate but the next adjacent tooth to the one last filed; therefore the return-movement will proceed over the alternate teeth which were not filed on the advance-movement. The same set of operations will be performed on the next reverse, the file here acting upon the first set of teeth the second time; and so on as many times over as may be desired.

Although the construction as above described is theoretically correct, I have found a practical disadvantage due to the friction of the member L in sliding upon the shaft during the feed-movement which makes the shaft harder to rotate at this point, and thereby gives an ununiform or jerky movement or on the longer feeds makes the shaft impossible to turn at all; and to avoid this I have arranged a device whereby the shaft C itself moves forward with the feed and is moved back again automatically during the interval between one feed and the next. This is accomplished by means of a pair of inclined helicoidal cam-surfaces $a^4$, $c^4$, of which the cam-surface $a^4$ is formed half-way around the shaft on the bearing-lug $a^1$ and the cam-surface $c^4$ on a collar $c^5$ which is secured to the shaft at a suitable distance from the bearing-lug $a^1$. The arrangement is, of course, duplicated at the other end of shaft C. The action is such as to permit the shaft to be drawn forward with the carriage during the feed-movement by friction of the members L and U, and when the carriage is stationary the engagement of the cam-surface $c^4$ with the cam-surface $a^4$ throws the shaft back to its previous position. The cams $a^4$ and $c^4$ at the left of Fig. 1 are active during the movement of the carriage from left to right, while the cams at the other end are inactive; and vice versa when the carriage is traveling in the opposite direction.

I will now describe the means whereby the saw F is set and clamped at the correct height, and also how the reversing-dogs $d^5$ are set to cause reversal of the carriage at the end of the saw.

On each of the shiftable blocks $d^2$ is an upright post $d^9$, on which is pivotally mounted a gage $d^{10}$, the pivot of said gage being at $d^{11}$ midway of the post, while the upper end of the post has a spring-pin $d^{12}$, the end of which is adapted to enter either of two perforations $d^{13}$ in the gage and thereby hold the gage either in the full-line or dotted-line position of Figs. 10 and 17. The end of the gage $d^{10}$ is provided with a chisel-edged point $d^{14}$, which is so set as to give exactly the right height for the saw-teeth when the gage is in its lower position and the point is seated between two teeth.

The fixed jaw D of the saw-clamp has a yoke $d^{15}$ extending around the movable jaw E, and a pair of depending ears $d^{16}$ carrying pivot-pins $d^{17}$, on which turn the pivot-ears $e^1$ of the movable jaw E. Each of the jaws D and E is preferably provided with a wooden bearing-face, designated respectively $d^{18}$ and $e^2$. The means for pressing up the movable jaw E against the fixed jaw consists of a plurality of set-screws $d^{19}$ turning in threaded apertures in the yoke $d^{15}$ and pressing against the heads of sliding-pins $d^{20}$ which press directly against the back of the jaw E. In order to hold these set-screws tight, a cushion-spring $d^{21}$ is preferably inserted between the end of each screw and its pin $d^{20}$. This provides that when, for example, the middle screws have been screwed up, they shall not become loose when the other screws are screwed up afterward, due to yielding of the yoke $d^{15}$.

In addition to the permanent clamping-means just described, temporary clamping-means are provided so that the saw can be clipped loosely in the center sufficiently to hold it up while it is being adjusted in position. Such means comprise an arm $e^3$ carrying on its end a roller $e^4$, and a swinging clamp-lever $d^{22}$ pivoted at $d^{23}$ on the edge of the yoke $d^{15}$; said lever being provided with an inclined cam-edge $d^{24}$ adapted, when the lever is turned into the position shown in the drawings, to draw up the arm $e^3$ and thus clamp the saw in the center, assuming sufficient flexibility in the jaw E so as not to hold it firmly at the ends. In this position the saw can be shifted until it is accurately set by means of the gages $d^{10}$ as previously described, and the clamping-screws $d^{19}$ are then turned up to hold it firmly in its position. When the saw is to be removed after releasing the screws $d^{19}$, the jaw E is withdrawn from the saw by throwing the lever $d^{22}$ over to the opposite side of the arm $e^3$, where a second cam-surface $d^{25}$ comes in contact with the roller $e^4$ and pushes it down and thereby throws the jaw E open.

To further provide for setting the saw so that the file shall be adjusted correctly to the edge of the teeth an endwise adjustment is provided for the clamping-frame D; this frame being arranged to slide upon the frame A, the bolts $d^{26}$ which hold it in place being arranged to move longitudinally in slots $d^{28}$ in the frame A (Figs. 5 and 17). The frame A is provided at its ends with screw-threaded lugs $a^5$, in which are placed set-screws $a^6$ bearing against depending lugs $d^{27}$ on the ends of the frame D.

It will be understood of course that before the actual filing begins the gages $d^{10}$ are to be thrown up into the raised position shown in Fig. 17, so as to be out of the way of the file.

When it is desired to gum or punch out the teeth of the saw the filing-frame O is removed by extracting the pivot-pin $b^9$ on which it turns, removing the collar $u^9$ from the end of the shaft $u^7$ and also the rock-arm $r^{22}$ which is connected with the pitman $r^{12}$; and removing also the crank-pin $q^{18}$ by taking off the nut $q^{20}$. The gumming-frame Y (Figs. 24 to 32) is now inserted in place thereof. This frame, for the purpose of adjustment, as hereinafter explained, is not mounted directly upon the pin $b^9$ but upon a hollow eccentric sleeve $y^1$ which is perforated as shown to receive the pin $b^9$ and extends between the standards $b^{10}$. The axis of the sleeve $y^1$ lies immediately below that of the pin $b^9$, but in the course of adjustment it is shifted back and forward to a slight extent by the means hereinafter described. On this sleeve $y^1$ is mounted, first, the frame Y by means of a pair of lateral ears $y^2$, and secondly, the walking-beam $z^1$ which transmits the movement of the crank $n^3$ to the punch-holder Z and punch $z^2$.

The punch-holder Z is of cylindrical form and is arranged to reciprocate in the hollow bore $y^3$ of the frame Y, and it is connected by a pin $z^3$ to one of a pair of toggle-links $z^4$, $z^5$, the latter of which is pivoted on a stationary pin $z^6$ mounted between the two ears $y^2$ of the frame Y. By means of the pin $z^7$ the lengths $z^4$ and $z^5$ are pivotally connected with each other and with the third link $z^8$, which is pivoted by a pin $z^9$ to one end of the walking-beam $z^1$, the other end of this beam being connected by a pitman $z^{10}$ to the crank $n^3$. Inasmuch, however, as the movement to be given to the pitman $z^{10}$ is only a small fraction of that given to the link $q^{14}$ in the filing-frame, a special member $z^{11}$ is provided (see Fig. 30) to make the connection, said member $z^{11}$ carrying a crank-pin $z^{12}$ on which the end of the pitman $z^{10}$ is journaled, and being itself secured to the crank $n^3$ by a bolt $z^{13}$ passed through the hole in the end of the crank and secured by a nut $z^{14}$. To hold the piece $z^{11}$ in line with the crank, the pin $z^{12}$ may enter a recess in the hub of the crank $n^3$ as indicated by the dotted lines in Fig. 30.

In the end of the bore $y^3$ in which the punch-block reciprocates is set the die $z^{15}$, shown in detail in Fig. 27. This die rests against a shoulder formed by a fixed block $y^5$ secured to the end of the frame Y by bolts $y^6$. The bore of this block $y^5$ is in line with the bore $y^3$, but slightly smaller, thus forming an abutment-shoulder for the end of the die $z^{15}$ as shown. The die $z^{15}$ has a triangular aperture $z^{16}$ whose forward edge of course is the cutting edge and is properly hardened and shaped to fit the triangular cutting edge $z^{17}$ of the punch $z^2$. It will be observed that the latter has only one cutting angle $z^{17}$, being extended at the two upper angles to form a tongue $z^{18}$, which extends far enough forward to be permanently engaged with the upper part of the aperture $z^{16}$, thus forming a reaction bearing against the cutting operation. The die, on the other hand, has three cutting corners, and is so arranged that when one is worn down the die can be turned and another used. To enable this to be done, the die is provided with a tail-piece $z^{19}$, which fits in a shouldered recess $z^{20}$ at the back of the die and is secured thereto by suitable means such as a screw-pin $z^{21}$. This tail-piece extends beyond the block $y^5$, and has secured to its front end by means of a pin $z^{22}$ a ring or collar $z^{23}$, which is provided with an index $z^{24}$ reading against the front face of the block $y^5$ (see Fig. 31). This outer face $y^7$ may be graduated in degrees or provided with angle-marks designated "C" and "R," the same as the dial-plate $q^9$ heretofore described, for the setting of the punch and die at any desired angle. The tail-piece $z^{19}$ is preferably provided with grooves $z^{25}$ opposite the corners of the die, so as to prevent the occurrence of an internal shoulder and thus to facilitate the pushing out of the chips $f^1$ from the saw.

As will be seen from Fig. 25, the punch is adjustably mounted in its holder Z so that it can be turned at an angle along with the die $z^{15}$, and then both clamped in position by a headless set-screw $z^{25}$; and a forward-and-backward adjustment of the punch is secured by a headless set-screw $z^{26}$ which in turn is fixed by a locking set-screw $z^{27}$ abutting against one side thereof. Access to the set-screws $z^{25}$ and $z^{27}$ is obtained by an aperture $y^8$ in the wall of the member Y.

A forward-and-backward adjustment of the die $z^{15}$ is secured by means of the eccentric sleeve $y^1$ as heretofore indicated. On this sleeve $y^1$ is secured, by a set-screw $y^9$ or other suitable means, an arm $y^{10}$ which has on its free end a slotted arc $y^{11}$. This can be secured to the arm $y^{12}$ of the frame Y in any desired adjustment by means of the cap-screw $y^{13}$. By now changing the elevation of the arm $y^{10}$ in the manner described, the frame Y is moved backward or forward through a slight distance, which brings the working-face of the die closer to or farther from the saw, and thus the wear due to grinding down the working face can be compensated. The position of the punch is, of course, made to correspond by adjustment of the screw $z^{26}$.

The member Y is operated with respect to its vertical movement in the same way as the frame O, being provided with two arms $y^{14}$ and $y^{12}$, the former of which carries a cam-roller $y^{15}$ resting against the cam $n^2$, while the arm $y^{12}$ is fitted to receive the seat-member $o^4$ for the spring $o^3$, and with a set-screw $y^{16}$ and a lock-nut $y^{17}$. The socket-lugs $y^{18}$ supporting pins $y^{19}$, which perform the same function as the pins $o^{16}$, are also provided, and a set-screw $y^{20}$, mounted on the threaded lug $y^{21}$ and fixed in place by a lock-nut $y^{22}$, abuts on the upper end of the extension $v^3$ of the lever $v^1$ for a limit-gage, as hereinbefore described in the case of the filing-frame O. A roller $y^{23}$ for the cam $x^1$ is also provided.

As a precaution against the possibility of some of the punchings $f^1$ falling out of the cutting-end of the punch and getting caught on the saw-teeth, thus interfering with the cutting-operation, I may provide a pivoted chute or fender &, which consists of a piece of sheet-metal bent twice so that the ends $\&^1$ form ears, which are perforated to receive pivot-screws $\&^2$, mounted in lugs $y^{24}$ on the sides of the frame Y. The latter is slotted at $y^{25}$ to permit the saw-edge to be punched to pass between the punch and die, and the fender & is so arranged as to hang immediately below this slot when the frame is tilted up, as in Fig. 29, but to be pushed to one side thereof when the frame is lowered, as shown in Fig. 25. The obliquity of the active middle portion of the fender serves two purposes, first, to throw any particles $f^1$ falling thereon over upon the yoke $d^{15}$, and secondly, by engagement with the saw-edge and clamping jaw E to cause the fender to be thrown sidewise with each downward movement of the frame.

While the use of the fender & may be, under certain circumstances, a useful addition to the machine, it is not essential thereto and may be omitted.

It will be obvious, that while I have shown but two tools, namely, a gumming-tool and a file, for acting upon the edge of a saw, other devices may be used in the same connection either for the same purpose or for different purposes. In the following claims, as in the foregoing description, the term sharpening-device is used as including in its meaning any device used in the operation of putting a saw in proper condition for use.

It is understood that changes in the form, proportion, size, and minor details may be made within the scope of the claims without departing from the spirit or sacrificing any of the advantages of the invention.

Having thus described my invention, what I claim as new and desire to secure by Letters Patent is:

1. In a saw-sharpening machine, the combination of a base-frame, a clamping-device mounted thereon and adapted to secure a saw, a carriage mounted to travel on said frame in a direction parallel to the edge of said saw, a sharpening-device carried by said carriage, means for advancing said carriage intermittently through a distance equal to one or more times the pitch of the saw-teeth, mechanism operated by said carriage-advancing means for bringing said sharpening-device into position for sharpening a saw-tooth and advancing it through a given distance in each interval between the advance-movements of said carriage, and means for guiding the movement of said sharpening-device to follow a curve corresponding to the curve of the line of saw-teeth.

2. The combination of means for supporting a saw, a movable carriage moving in a parallel position to the saw, a continuously moving member, connections between said member and said carriage whereby the latter is alternately advanced and held stationary, the advance-movement being through a distance equal to twice the pitch of the saw-teeth, a saw-tooth-sharpening device mounted on said carriage and having two positions which make equal and symmetrical angles with the saw-blade, elements connecting said saw-sharpening device with said continuously moving member whereby said device is withdrawn from sharpening-position at the beginning of each advance-movement of the carriage and restored thereto at the end of each such movement, and a reversing-device located in the path of the carriage-travel and adapted at a certain point thereof to reverse said first-named connections whereby the carriage is made to travel in the opposite direction and simultaneously reverse said sharpening-device as to its angular position; there being means for causing the carriage to lose one tooth in the first return-movement whereby said sharpening-device is applied on said last-named movement to the alternate teeth not sharpened on the advance-movement.

3. The combination of means for supporting a saw, a movable carriage moving in a parallel position to the saw, a continuously moving member, connections between said member and said carriage whereby the latter is alternately advanced and held stationary, the advance-movement being through a distance equal to twice the pitch of the saw-teeth, a saw-tooth-sharpening device mounted on said carriage and having two positions which make equal and symmetrical angles with the saw-blade, elements connecting said saw-sharpening device with said continuously moving member whereby said device is withdrawn from sharpening-position at the beginning of each advance-movement of the carriage and restored thereto at the end of each such movement, a reversing device located in the path of the carriage-travel and adapted at a certain point thereof to reverse said first-named connections whereby the carriage is made to travel in the opposite direction and simultaneously to reverse said sharpening-device to the angular position, a locking-device adapted to lock said sharpening-device in either of its angular positions, and means actuated by said reversing-device for releasing the locking-device each time just before the reversing-movement; there being means for causing the carriage to lose one tooth in the first return-movement whereby said sharpening-device is applied on said last-named movement to the alternate teeth not sharpened on the advance-movement.

4. The combination of means for supporting a saw, a movable carriage moving in a parallel position to the saw, a continuously moving member, connections between said member and said carriage whereby the latter is alternately advanced and held stationary, a saw-tooth-sharpening device mounted on said carriage and having two positions which make equal and symmetrical angles with the saw-blade, a movable element connected with said sharpening-device and adapted to reverse the angle thereof, and a connection between said movable element and the connections between said member and said carriage adapted to reverse such connections whereby the direction of advance of the carriage is reversed simultaneously with the angle of said sharpening-device.

5. The combination of means for supporting a saw, a movable carriage moving in a parallel position to the saw, a continuously moving member, connections between said member and said carriage whereby the latter is alternately advanced and held stationary, a saw-tooth sharpening-device mounted on said carriage and having two positions which make equal and symmetrical angles with the saw-blade, a movable element connected with said sharpening-device and adapted to reverse the angle thereof, a connection between said movable element and the connections between said member and said carriage adapted to reverse such connections whereby the direction of advance of the carriage is reversed simultaneously with the angle of said sharpening-device, a locking-device adapted to lock said sharpening-device in either of its two angular positions, and a connection with said movable element adapted to release said locking-device each time just before said sharpening-device is shifted.

6. In a machine of the class described, the combination of a holder adapted to support a movable sharpening-device, a member supporting said holder and pivoted to turn about a center to a certain angle, the axis of turning being substantially at right angles to the sharpening-movement of said sharpening device, the two positions of said support corresponding to positions of said sharpening-device wherein the sharpening-surface makes equal and opposite angles with the saw-blade, a locking-device adapted to lock said supporting member in each of said angular positions, and an actuating member adapted in its movement, first to release said locking-device and then to reverse the angular position of said supporting-member.

7. In a machine of the class described, a reciprocating holder, a file carried thereby, a shifting-head in which said holder is reciprocably supported, said head being pivoted to turn about an axis and having two positions corresponding to equal and opposite angles of the file with respect to the saw-blade, means for reciprocating said file independently of the position of said head, and a link adapted to shift said head from one position to the other.

8. In a machine of the class described, a reciprocating holder, a file carried thereby, a shifting-head in which said holder is reciprocably supported, said head being pivoted to turn about an axis and having two positions corresponding to equal and opposite angles of the file with respect to the saw-blade, means for reciprocating said file independently of the position of said head, a link adapted to shift said head from one position to the other, a locking-device adapted to lock said shifting-head in either of its said two positions, and means actuated by said link for releasing said locking-device on each shifting-movement and before said head is shifted.

9. In a machine of the class described, a reciprocating holder, a file carried thereby, a shifting-head in which said holder is reciprocably supported, said head being pivoted to turn about an axis and having two positions corresponding to equal and opposite angles of the file with respect to the saw-blade, means for reciprocating said file independently of the position of said head, a stationary locking-pin adapted to engage and secure said shifting-head in either of its two angular positions, means for causing said pin normally to assume the locking position, and a member adapted by continuous movement first to withdraw said pin so as to release said shifting-head and then to turn said head to the opposite position and release said locking-pin so as to permit it to lock said head in said last-named position.

10. In a machine of the class described, a longitudinally moving carriage, means for supporting a saw with its edge parallel to the movement of said carriage, a file supported by said carriage, means for giving said file a four-motional cyclical movement, said movement consisting in advancing, raising, retracting and lowering said file in the order named; and a guiding-device adapted to cause the lowered position of the file to follow the curved edge of the saw in its successive cycles.

11. In a machine of the class described, a longitudinally moving carriage, means for supporting a saw having a curved edge with the plane of its edge parallel to the movement of the carriage, a sharpening-device carried by said carriage, and a curved guide-bar having a guiding-edge corresponding to the saw-edge, said sharpening-device being in its sharpening position movable toward and from said saw-edge and having a member resting upon said guiding-edge and thereby keeping said sharpening device at a fixed distance with respect to said saw-edge.

12. The combination of a continuously rotating shaft, a carriage moving parallel to said shaft, a rotary member mounted on said carriage concentric with said shaft and having a sliding key-connection therewith whereby it rotates with said shaft, said member moving longitudinally with said carriage, means operated by said rotating member for advancing said carriage intermittently by steps of definite length alternating with intervals of rest, said shaft having a longitudinal free movement permitting it to advance with the movement of the carriage through a distance equal to one step thereof, and a device adapted during the intervals of rest of said carriage to retract said shaft through an axial distance equal to that through which it was advanced.

13. The combination of a continuously rotating shaft, a carriage moving parallel to said shaft, a rotary member mounted on said carriage concentric with said shaft and having a sliding key-connection therewith whereby it rotates with said shaft, said member moving longitudinally with said carriage, means operated by said rotating member for advancing said carriage intermittently by steps of definite length alternating with intervals of rest, said shaft having a longitudinal free movement permitting it to advance with the movement of the carriage through a distance equal to one step thereof, and a cam adapted during the intervals of rest of said carriage to retract said shaft through an axial distance equal to that through which it was advanced.

14. The combination of a continuously rotating shaft, a carriage moving parallel to said shaft, a rotary member mounted on said carriage concentric with said shaft and having a sliding key-connection therewith whereby it rotates with said shaft, said member moving longitudinally with said carriage, means operated by said rotating member for advancing said carriage intermittently by steps of definite length alternating with intervals of rest, said shaft having a longitudinal free movement permitting it to advance with the movement of the carriage through a distance equal to one step thereof; a device adapted during the intervals of rest of said carriage to retract said shaft through an axial distance equal to that through which it was advanced, and a clamping-device adapted and acting to clamp said carriage in a fixed position during the intervals of rest.

15. The combination of means for supporting a saw, a carriage having a movement parallel to said saw, means for advancing said carriage by a step-by-step movement, an oscillating member on said carriage one end of which has a movement toward and from the edge of said saw in the plane of said saw, a tool-holder on said end of the oscillating member, a reciprocating sharpening-device mounted in said tool-holder and having a reciprocating movement across the edge of said saw, a set of mechanical connections adapted to depress said end of the oscillating member and the holder carried thereon to a variable limit hereinafter named, advance said sharpening-device in the depressed position during an interval of rest of said carriage and said oscillating member, raise said end of the oscillating member and said sharpening device, retract said sharpening-device in the raised position and simultaneously advance said carriage one step, and repeat said cycle of operations indefinitely in the order named; a stationary guide-member having a guiding-edge conforming in curvature or shape to that of the saw-edge, a stop carried by said oscillating member and adapted to abut upon said guiding edge in the depressed position of the sharpening-device, and means for holding said oscillating member with said stop in the abutting position during the advance-movement of said sharpening-device.

16. The combination of means for supporting a saw, a carriage having a movement parallel to said saw, a stationary rack, a gear mounted on said carriage and engaging said rack, a feed-wheel turning with and driving said gear, a reciprocating double-nosed pawl having two alternative positions adapted for driving said feed-wheel in respectively opposite directions, a continuously rotating shaft, means turning with said shaft for reciprocating said pawl whereby the carriage is given a step-by-step feed-movement in one direction or the other according to the position of said pawl, the length of each feed-step of the carriage being equal to twice the pitch of the saw-teeth and there being a lost motion between said feed-wheel and said gear equal to the pitch of the saw-teeth, a sharpening-device adapted to act on the saw-teeth, and means operatively connected with said shaft for actuating said sharpening-device to remove it from sharpening-position during the intervals of motion and place it in sharpening-position during intervals of rest of the carriage; whereby said sharpening-device is caused by the feed-movement to act on every alternate tooth of the saw and on reversing the movement of the feed by throwing over said pawl, said sharpening-device is caused to act on alternate teeth lying between those acted on in the advance-movement.

17. The combination of means for supporting a saw, a carriage having a movement parallel to said saw, a stationary rack, a gear mounted on said carriage and engaging said rack, a feed-wheel turning with and driving said gear, a reciprocating double-nosed pawl having two alternative positions adapted for driving said feed-wheel in respectively opposite directions, a continuously rotating shaft, means turning with said shaft for reciprocating said pawl whereby the carriage is given a step-by-step feed-movement in one direction or the other according to the position of said pawl, the length of each feed-step of the carriage being equal to twice the pitch of the saw-teeth and there being a lost motion between said feed-wheel and said gear equal to the pitch of the saw-teeth, a sharpening-device adapted to act on the saw-teeth, and means operatively connected with said shaft for actuating said sharpening-device to remove it from sharpening-position during the intervals of motion and place it in sharpening-position during intervals of rest of the carriage; whereby said sharpening-device is caused by the feed-movement to act on every alternate tooth of the saw and on reversing the movement of the feed by throwing over said pawl, said sharpening-device is caused to act on alternate teeth lying between those acted on in the advance-movement; in conjunction with a device fixed with respect to said rack and saw and adapted to reverse said pawl at a predetermined point in the advance-movement of said carriage.

18. The combination of means for supporting a saw, a carriage having a movement parallel to said saw, a stationary rack, a gear mounted on said carriage and engaging said rack, a feed-wheel turning with and driving said gear, a reciprocating double-nosed pawl having two alternative positions adapted for driving said feed-wheel in respectively opposite directions, a continuously rotating shaft, means turning with said shaft for reciprocating said pawl whereby the carriage is given a step-by-step feed-movement in one direction or the other according to the position of said pawl, the length of each feed-step of the carriage being equal to twice the pitch of the saw-teeth and there being a lost motion between said feed-wheel and said gear equal to the pitch of the saw-teeth, a sharpening-device adapted to act on the saw-teeth, and means operatively connected with said shaft for actuating said sharpening-device to remove it from sharpening-position during the intervals of motion and place it in sharpening-position during intervals of rest of the carriage; whereby said sharpening-device is caused by the feed-movement to act on every alternate tooth of the saw and on reversing the movement of the feed by throwing over said pawl, said sharpening-device is caused to act on alternate teeth lying between those acted on in the advance-movement; in conjunction with two devices at opposite ends of the travel of the carriage and adjustable in position with respect to said saw, each of which is adapted to cause the reversal of said pawl when the carriage has reached a predetermined point in its movement in either direction, whereby the movement of the carriage is reversed and said sharpening-device caused to act on one set of alternate teeth when moving in one direction and the other set of alternate teeth when moving in the other direction.

19. The combination of means for supporting a saw; a carriage having a movement parallel to said saw; a stationary rack; a gear mounted on said carriage and engaging said rack; a feed-wheel turning with and driving said gear; a reciprocating double-nosed pawl having two alternative positions adapted for driving said feed-wheel in respectively opposite directions; a continuously rotating shaft; means turning with said shaft for reciprocating said pawl whereby the carriage is given a step-by-step feed-movement in one direction or the other according to the position of said pawl, the length of each feed-step of the carriage being equal to twice the pitch of the saw-teeth and there being a lost motion between said feed-wheel and said gear equal to the pitch of the saw-teeth; a sharpening-device adapted to act on the saw-teeth; means operatively connected with said shaft for actuating said sharpening-device to remove it from sharpening-position during the intervals of motion and place it in sharpening-position during intervals of rest of the carriage, whereby said sharpening-device is caused by the feed-movement to act on every alternate tooth of the saw and on reversing the movement of the feed by throwing over said pawl said sharpening device is caused to act on alternate teeth lying between those acted on in the advance-movement; said sharpening-device having a sharpening-face adapted to stand at an acute angle with the plane of said saw and having further two positions in which said sharpening-face makes equal and opposite angles with the plane of said saw; and a device fixed with respect to said saw adapted at a predetermined point in the movement of the carriage to concomitantly throw over said pawl and reverse the position of said sharpening-device whereby said carriage is reversed in direction and simultaneously the angle of said sharpening-device reversed.

20. The combination of means for supporting a saw; a carriage having a movement parallel to said saw; a stationary rack; a gear mounted on said carriage and engaging said rack; a feed-wheel turning with and driving said gear; a reciprocating double-nosed pawl having two alternative positions adapted for driving said feed-wheel in respectively opposite directions; a continuously rotating shaft; means turning with said shaft for reciprocating said pawl whereby the carriage is given a step-by-step feed-movement in one direction or the other according to the position of said pawl, the length of each feed-step of the carriage being equal to twice the pitch of the saw-teeth and there being a lost motion between said feed-wheel and said gear equal to the pitch of the saw-teeth; a sharpening-device adapted to act on the saw-teeth; means operatively connected with said shaft for actuating said sharpening-device to remove it from sharpening position during the intervals of motion and place it in sharpening position during intervals of rest of the carriage, whereby said sharpening-device is caused by the feed-movement to act on every alternate tooth of the saw and on reversing the movement of the feed by throwing over said pawl, said sharpening-device is caused to act on alternate teeth lying between those acted on in the advance-movement; said sharpening-device having a sharpening-face adapted to stand at an acute angle with the plane of said saw and having further two positions in which said sharpening-face makes equal and opposite angles with the plane of said saw; a rock-shaft having two positions and connected with said pawl so as to reverse the same when the rock-shaft is reversed and also connected with said sharpening device in like manner; and a dog disposed at a point in the movement of said carriage at which it is adapted to reverse the position of said rock-shaft.

21. The combination of means for supporting a saw, a carriage having a movement parallel to said saw, a stationary rack, a gear mounted on said carirage and engaging said rack, a feed-wheel turning with and driving said gear, a reciprocating double-nosed pawl having two alternative positions adapted for driving said feed-wheel in respectively opposite directions; a continuously rotating shaft; means turning with said shaft for reciprocating said pawl, whereby the carriage is given a step-by-step feed-movement in one direction or the other according to the position of said pawl, the length of each feed-step of the carriage being equal to twice the pitch of the saw-teeth and there being a lost motion between said feed-wheel and said gear equal to the pitch of the saw-teeth, a sharpening-device adapted to act on the saw-teeth; and means operatively connected with said shaft for actuating said sharpening-device to remove it from sharpening-position during the intervals of motion and place it in sharpening-position during intervals of rest of the carriage, whereby said sharpening-device is caused by the feed-movement to act on every alternate tooth of the saw and on reversing the movement of the feed by throwing over said pawl, said sharpening-device is caused to act on alternate teeth lying between those acted on in the advance-movement; said sharpening-device having a sharpening-face adapted to stand at an acute angle with the plane of said saw and having further two positions in which said sharpening-face makes equal and opposite angles with the plane of said saw; a rock-shaft having two positions and connected with said pawl so as to reverse the same when the rock-shaft is reversed and also connected with said sharpening device in like manner; a rock-arm on said rock-shaft; a dog disposed at a fixed point where it is adjacent to said rock-arm at a predetermined point in the movement of said carriage; and a member on said carriage actuated by said shaft to strike said dog and throw it against said rock-arm, thereby reversing said rock-shaft when said carriage reaches said point of its movement.

22. The combination of means fo supporting a saw, a carriage having a movement parallel to said saw, means for advancing said carriage by a step-by-step movement, a saw-sharpening device having three angular positions two of which make equal and opposite acute angles with the saw-blade and the other or middle position, a right angle therewith, a shiftable member having two alternative positions corresponding to the two extreme positions of said sharpening device, disconnectible means for operatively connecting said saw-sharpening device with said shiftable member, and means for holding said saw-sharpening device fixed in its central position.

23. The combination of means for supporting a saw, a carriage having a movement parallel to said saw, means for advancing said carriage by a step-by-step movement, a saw-sharpening device having three angular positions two of which make equal and opposite acute angles with the saw-blade and the other or middle position, a right angle therewith, a shiftable member having two alternative positions corresponding to the two extreme positions of said sharpening-device, and a shiftable engaging-pin adapted to operatively connect or engage said saw-sharpening device with said shiftable member when placed in one position and to disconnect it therefrom and fix said sharpening-device in the middle position when said engaging-pin is in another position.

24. The combination of a frame, saw-supporting means mounted thereon, a continuously rotating shaft journaled on said frame and parallel to the saw, a carriage traveling parallel to the axis of said shaft, a rotating member journaled on said carriage and turning with said shaft and sliding thereon, a rack parallel to said shaft, a gear engaging said rack, a feed-wheel driving said gear, a reciprocating pawl adapted to drive said feed-wheel intermittently, mechanical connections between said rotating member and said pawl adapted to reciprocate the latter, an oscillating member mounted on said carriage, means driven by said rotating member for oscillating said oscillating member, a saw-sharpening file, a reciprocating file-holder supporting said file, a shifting-head having sliding-bearings for said holder and supporting the same, said shifting-head being mounted upon the end of said oscillating member directly over said saw and having a movement toward and from said saw and having further an angular shift with respect to said oscillating member, said file being adapted to occupy positions with respect to said saw making equal and opposite acute angles therewith, mechanical connections between said file-holder and said rotating member adapted to reciprocate said file-holder independently of its angular position and vertical movement, and means for locking said shifting-head in its adjusted position.

25. The combination of a frame, a saw-supporting means mounted thereon, a continuously rotating shaft journaled on said frame and parallel to the saw, a carriage traveling parallel to the axis of said shaft, a rotating member journaled on said carriage and turning with said shaft and sliding thereon, a rack parallel to said shaft, a gear engaging said rack, a feed-wheel driving said gear, a reciprocating pawl adapted to drive said feed-wheel intermittently, said pawl being double-ended whereby it is adapted to drive said feed-wheel in either direction according as it is in either of two positions, a member adapted to reverse the position of said pawl, mechanical connections between said rotating member and said pawl adapted to reciprocate the latter, an oscillating member mounted on said carriage, means driven by said rotating member for oscillating said oscillating member, a saw-sharpening file, a reciprocating file-holder supporting said file, a shifting-head having sliding-bearings for said holder and supporting the same, said shifting-head being mounted upon the end of said oscillating member directly over said saw and having a movement toward and from said saw and having further an angular shift with respect to said oscillating member, said file being adapted to occupy positions with respect to said saw making equal and opposite acute angles therewith, mechanical connections between said file-holder and said rotating member adapted to reciprocate said file-holder independently of its angular position and vertical movement, means for locking said shifting-head in its adjusted position, a rock-shaft, connections between said rock-shaft and said pawl-reversing member, connections between said rock-shaft and said shifting-head whereby the reversal of said rock-shaft causes the concomitant reversal of said pawl and of said shifting-head; a trip-arm carried by said rock-shaft, a movable trip-member which is disposed in a stationary position adjacent to said trip-arm at a certain point in the movement of said carriage, and a member mounted on said carriage and operated by said rotating member to strike said trip-member and cause the latter to move so as to reverse said trip-arm when the latter is adjacent thereto.

26. The combination of a frame, means mounted on said frame for sharpening a saw, a saw-clamping and supporting device mounted on said frame, and a pair of gages mounted at opposite ends of said saw-clamping and supporting device and adapted to indicate the correct height and position of the saw when clamped, said gages having pointed ends adapted to reach the bottom of the notch between adjacent saw-teeth and one gage being longitudinally adjustable.

27. The combination of a frame, means mounted on said frame for sharpening a saw, a saw-clamping and supporting device mounted on said frame, and an adjustable gage mounted at one end of said saw-clamping and -supporting device and adapted to indicate the correct height of the position of the saw when clamped, said gage comprising a pointer having two definite positions in one of which it forms an abutment against one of the saw-teeth during the setting of the saw in the clamp, and in the other of which positions it is out of the way of said sharpening-means.

28. The combination of a frame, means mounted on said frame for sharpening a saw, a saw-clamping and -supporting device mounted on said frame, an adjustable gage mounted on said saw-clamping and -supporting device and adapted to indicate the correct height of the position of the saw when clamped, said gage comprising a pivoted arm carrying an index which is adapted to form an abutment against which the saw-edge rests while it is being set in a clamp in one position of said clamp and being adapted to be turned up out of the way of said sharpening means, and a locking-pin adapted to fix said pivoted arm in either position.

29. The combination of a frame, means mounted on said frame for sharpening a saw, a saw-clamping and -supporting device mounted on said frame, a gage mounted on said saw-clamping and -supporting device and adapted to indicate the correct height of the position of the saw when clamped; said gage comprising a block slidable on said supporting- and clamping-device parallel to the edge of the saw, means for securing said block in an adjusted position, an arm pivoted on said block and carrying an index, and means for securing said arm temporarily in either of two definite positions in one of which it acts as a gage for setting the saw in the clamp.

30. The combination of a frame, a device mounted on said frame adapted to support a saw in position for sharpening, a carriage running on said frame parallel to the saw-edge, means for driving said carriage by a step-by-step movement in either direction on said frame, a sharpening-device mounted on said carriage and adapted to act on the teeth of the saw, operative connections between said driving-means and said sharpening-device for operating the latter, a reversing member mounted on said carriage and adapted to reverse the direction thereof, said reversing member being adapted for operation by a stationary dog or trip, a block secured to said supporting- and clamping-device adjacent to the saw and having longitudinal adjustment parallel to the edge thereof whereby its position may be made to correspond to the end-tooth of the saw, a dog carried by said block and adapted to operate said reversing-member when it comes into conjunction therewith by the movement of said carriage, and an index-finger carried by said block and adapted to indicate the end-tooth of the saw in the setting of said block.

31. The combination of a frame, a device mounted on said frame adapted to support a saw in position for sharpening, a carriage running on said frame parallel to the saw-edge, means for driving said carriage by a step-by-step movement in either direction on said frame, a sharpening-device mounted on said carriage and adapted to act on the teeth of the saw, operative connections between said driving-means and said sharpening-device for operating the latter, a reversing-member mounted on said carriage and adapted to reverse the direction thereof, said reversing-member being adapted for operation by a dog or trip, a block secured to said supporting- and clamping-device adjacent to the saw and having longitudinal adjustment parallel to the edge thereof whereby its position may be made to correspond to the end-tooth of the saw, a dog carried by said block and adapted to operate said reversing-member when it comes into conjunction therewith by the movement of said carriage, an arm pivotally mounted on said block and having an index which is in one position of said arm adapted to indicate by abutment of the correct elevation of the saw and also the longitudinal position of said block with respect to the end-tooth of the saw, and means for fixing said arm temporarily either in said position or in another position in which said arm is out of the way of said sharpening-device.

32. The combination of a stationary frame, means for supporting a saw thereon, a longitudinally moving carriage moving in a direction parallel to the edge of the saw, a continuously rotating shaft mounted in bearings in said frame, a rotating member splined on said shaft and rotating therewith and turning in bearings in said carriage being longitudinally movable with said carriage on said shaft, a rack-bar parallel to said shaft, a pawl-feed operated by said rotating splined member in connection with said rack-bar to feed said carriage, a moving tool adapted to sharpen the teeth of the saw mounted on said carriage, and means mechanically connected with said shaft for imparting movement to said tool.

33. The combination of a stationary frame, means for supporting a saw thereon, a longitudinally moving carriage moving in a direction parallel to the edge of the saw, a continuously rotating shaft mounted in bearings in said frame, a rotating member splined on said shaft and rotating therewith and turning in bearings in said carriage being longitudinally movable with said carriage on said shaft, a rack-bar parallel to said shaft, a gear-pinion mounted on said carriage and meshing with said rack-bar, a ratchet-wheel secured to and rotating coaxially with said pinion, a pawl engaging said ratchet-wheel and reciprocated by said splined member and means for varying the travel of said pawl whereby the effective feed is varied to correspond with the pitch of the saw-teeth, a moving tool adapted to sharpen the teeth of the saw mounted on said carriage, and means mechanically connected with said shaft for imparting movement to said tool.

34. The combination of means for supporting a saw, a movable carriage moving in a direction parallel to the edge of said saw, a tool-holding-device adapted to support a tool adapted to sharpen the teeth of the saw, a continuously rotating member, connections between said rotating member and the tool whereby the latter is moved so as to sharpen the teeth of the saw, said tool-holding device being mounted so it can be advanced toward and retracted from the edge of the saw, a spring exerting pressure on said tool-holding device to press the tool against the saw during the sharpening operation, means for alternately increasing the pressure upon said spring during the sharpening operation and decreasing it the rest of the time and means connected with said continuously rotating member for advancing and retracting the tool-holding device.

35. In a machine of the class described, a longitudinally moving carriage, means for supporting a saw with its edge parallel to the movement of said carriage, a tool supported by said carriage and adapted to act upon the teeth of the saw, said tool moving with said carriage, and means for giving to the longitudinal movement of the tool a light curvature substantially equal to the longitudinal curvature of the line of saw-teeth.

In witness whereof, I have hereunto set my hand this twenty-sixth day of December, 1912.

JOSEPH MIOTKE

Witnesses:
GEORGE ATMORE COLLES,
ELEANOR RINK.

Copies of this patent may be obtained for five cents each, by addressing the "Commissioner of Patents, Washington, D. C."